US012052075B2

(12) United States Patent
Frenne et al.

(10) Patent No.: US 12,052,075 B2
(45) Date of Patent: *Jul. 30, 2024

(54) SYSTEMS AND METHODS FOR DETERMINING TRANSMITTER AND RECEIVER CONFIGURATIONS FOR A WIRELESS DEVICE

(71) Applicant: Telefonaktiebolaget LM Ericsson (publ), Stockholm (SE)

(72) Inventors: Mattias Frenne, Uppsala (SE); Stephen Grant, Pleasanton, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,450

(22) Filed: Feb. 19, 2020

(65) Prior Publication Data
US 2020/0186221 A1 Jun. 11, 2020

Related U.S. Application Data

(63) Continuation of application No. 15/769,470, filed as application No. PCT/SE2018/050302 on Mar. 23, 2018, now Pat. No. 10,615,859.
(Continued)

(51) Int. Cl.
*H04B 7/06* (2006.01)
*H04B 7/024* (2017.01)

(52) U.S. Cl.
CPC .......... *H04B 7/0617* (2013.01); *H04B 7/024* (2013.01); *H04B 7/0626* (2013.01); *H04B 7/0634* (2013.01); *H04B 7/0695* (2013.01)

(58) Field of Classification Search
CPC .... H04B 7/0617; H04B 7/024; H04B 7/0626; H04B 7/0634; H04B 7/0695; H04B 17/373
See application file for complete search history.

(56) References Cited

U.S. PATENT DOCUMENTS 9,769,807 B2 * 9/2017 Jongren .............. H04L 25/0204
9,801,192 B2 10/2017 Kim et al.
(Continued)

FOREIGN PATENT DOCUMENTS

CN    105308879    *  2/2016  .......... H04B 7/0417
CN    105308879 A    2/2016
(Continued)

OTHER PUBLICATIONS

NTT Docomo Inc. Views on Beam Management Framework, 3GPP TSG RAN WG1, Meeting #88, R1-1702798, Feb. 2017 (Year: 2017).*
(Continued)

*Primary Examiner* — Berhanu Tadese
(74) *Attorney, Agent, or Firm* — Baker Botts L.L.P.

(57) ABSTRACT

Systems and methods of determining transmitter and receiver configurations for a wireless device are provided. In one exemplary embodiment, a method performed by a wireless device (105, 200, 300a-b, 500, 605) in a wireless communications system (100) comprises transmitting or receiving (403) a first signal of a first type (113) using a first transmitter or receiver configuration based on a first quasi co-location (QCL) assumption (121) associating the first signal with a first reference signal (111) received by the wireless device. Further, the method includes transmitting or receiving (407) a second signal of a second type (117) using a second transmitter or receiver configuration based on a second QCL assumption (123) associating the second signal with a second reference signal (115) received by the wireless device.

20 Claims, 10 Drawing Sheets

Related U.S. Application Data

(60) Provisional application No. 62/476,657, filed on Mar. 24, 2017.

(56) References Cited

U.S. PATENT DOCUMENTS

| | | | |
|---|---|---|---|
| 10,178,661 B2 | 1/2019 | Frenne et al. | |
| 10,187,135 B2 | 1/2019 | Kim et al. | |
| 2015/0230220 A1 | 8/2015 | Li et al. | |
| 2015/0334762 A1* | 11/2015 | Yang | H04W 72/20 370/329 |
| 2015/0349855 A1* | 12/2015 | Sesia | H04B 7/024 370/252 |
| 2016/0072572 A1 | 3/2016 | Kang et al. | |
| 2016/0119936 A1 | 4/2016 | Kim et al. | |
| 2016/0134408 A1 | 5/2016 | Kim et al. | |
| 2016/0135194 A1 | 5/2016 | Kim et al. | |
| 2016/0174247 A1 | 6/2016 | Ruiz Delgado et al. | |
| 2016/0248561 A1* | 8/2016 | Davydov | H04B 7/024 |
| 2017/0034799 A1 | 2/2017 | Kim et al. | |
| 2017/0188371 A1 | 6/2017 | Kim et al. | |
| 2017/0223695 A1 | 8/2017 | Kwak et al. | |
| 2017/0230994 A1 | 8/2017 | You et al. | |
| 2017/0303136 A1 | 10/2017 | Park et al. | |
| 2017/0353949 A1 | 12/2017 | Frenne et al. | |
| 2018/0083680 A1 | 3/2018 | Guo et al. | |
| 2018/0102817 A1 | 4/2018 | Park et al. | |
| 2018/0110034 A1 | 4/2018 | Li et al. | |
| 2018/0115357 A1 | 4/2018 | Park et al. | |
| 2018/0131426 A1 | 5/2018 | Lee et al. | |
| 2018/0132227 A1 | 5/2018 | Ghosh et al. | |
| 2018/0212800 A1 | 7/2018 | Park et al. | |
| 2018/0220400 A1 | 8/2018 | Nogami et al. | |
| 2018/0227786 A1 | 8/2018 | Yu et al. | |
| 2018/0234959 A1 | 8/2018 | Ahn et al. | |
| 2018/0235008 A1 | 8/2018 | Park et al. | |
| 2018/0242327 A1 | 8/2018 | Frenne et al. | |
| 2018/0248607 A1 | 8/2018 | Park et al. | |
| 2018/0270713 A1 | 9/2018 | Park et al. | |
| 2018/0270791 A1 | 9/2018 | Park et al. | |
| 2018/0270792 A1* | 9/2018 | Park | H04W 68/025 |
| 2018/0270894 A1 | 9/2018 | Park et al. | |
| 2018/0270895 A1 | 9/2018 | Park et al. | |
| 2018/0279193 A1 | 9/2018 | Park et al. | |
| 2018/0279218 A1 | 9/2018 | Park et al. | |
| 2018/0279297 A1 | 9/2018 | Nogami et al. | |
| 2018/0288755 A1 | 10/2018 | Liu et al. | |
| 2018/0288756 A1 | 10/2018 | Xia et al. | |
| 2018/0302889 A1 | 10/2018 | Guo et al. | |
| 2018/0324770 A1 | 11/2018 | Nogami et al. | |
| 2018/0331727 A1 | 11/2018 | John Wilson et al. | |
| 2018/0331860 A1 | 11/2018 | Bergman et al. | |
| 2018/0367374 A1 | 12/2018 | Liu et al. | |
| 2018/0368009 A1 | 12/2018 | Xia et al. | |
| 2018/0368142 A1 | 12/2018 | Liou | |
| 2018/0375636 A1 | 12/2018 | You et al. | |
| 2019/0007175 A1 | 1/2019 | Kwak et al. | |
| 2019/0021079 A1 | 1/2019 | Stirling-Gallacher et al. | |
| 2019/0029036 A1 | 1/2019 | John Wilson et al. | |
| 2019/0037426 A1 | 1/2019 | Yu et al. | |
| 2019/0037555 A1 | 1/2019 | Kim et al. | |
| 2019/0044792 A1 | 2/2019 | Kwon et al. | |
| 2019/0045487 A1 | 2/2019 | You et al. | |
| 2019/0052339 A1 | 2/2019 | Zhou et al. | |
| 2019/0053288 A1 | 2/2019 | Zhou et al. | |
| 2019/0053294 A1 | 2/2019 | Xia et al. | |
| 2019/0053312 A1 | 2/2019 | Xia et al. | |
| 2019/0053313 A1 | 2/2019 | Zhou et al. | |
| 2019/0053314 A1* | 2/2019 | Zhou | H04B 7/0695 |
| 2019/0074880 A1 | 3/2019 | Frenne et al. | |
| 2019/0173532 A1* | 6/2019 | Liu | H04B 7/024 |
| 2019/0215044 A1* | 7/2019 | Noh | H04B 7/0626 |
| 2019/0221079 A1 | 7/2019 | Carpenter et al. | |
| 2019/0260425 A1* | 8/2019 | Ji | H04L 5/0091 |
| 2019/0334599 A1* | 10/2019 | Davydov | H04W 64/00 |
| 2019/0356379 A1* | 11/2019 | Takeda | H04W 72/04 |
| 2020/0014514 A1* | 1/2020 | Gao | H04W 72/082 |
| 2020/0028563 A1* | 1/2020 | Gao | H04L 5/0091 |

FOREIGN PATENT DOCUMENTS

| | | | | |
|---|---|---|---|---|
| CN | 105308879 A | * | 2/2016 | .......... H04B 7/0413 |
| CN | 107888266 A | * | 4/2018 | .......... H04W 72/048 |
| CN | 105308879 B | * | 7/2019 | .......... H04B 7/0413 |
| EP | 3649803 A4 | * | 9/2020 | .......... H04L 5/0048 |
| JP | 2015513237 | * | 2/2013 | .......... H04B 7/2621 |
| JP | 2016518752 | * | 6/2014 | .......... H04B 7/0802 |
| JP | 2015513237 A | | 4/2015 | |
| JP | 2016518752 A | | 6/2016 | |
| JP | 2016531495 A | | 10/2016 | |
| JP | 2016532365 | * | 10/2016 | |
| JP | 2016532365 A | | 10/2016 | |
| JP | 2016531495 | * | 9/2017 | .......... H04L 5/0035 |
| WO | 2014 209015 A1 | | 12/2014 | |
| WO | WO2018045307 A1 | | 3/2018 | |
| WO | WO-2018045307 A1 | * | 3/2018 | .......... H04W 48/12 |
| WO | WO-2018059458 A1 | * | 4/2018 | .......... H04W 28/18 |
| WO | 2018 174803 A1 | | 9/2018 | |
| WO | WO-2018172001 A1 | * | 9/2018 | .......... H04B 7/088 |
| WO | WO-2018172987 A1 | * | 9/2018 | .......... H04L 5/0023 |
| WO | WO-2018174803 A1 | * | 9/2018 | .......... H04B 7/024 |
| WO | 2018 228532 A1 | | 12/2018 | |
| WO | WO-2018228532 A1 | * | 12/2018 | .......... H04W 72/042 |

OTHER PUBLICATIONS

NTT Docomo et al: "Views on Beam Management Framework", 3GPP Draft; R1-1702798, Feb. 2017; (Year: 2017).*

Official Action issued for Chinese Application No. 201880033922.9—Oct. 31, 2022 (cited on IDS of Feb. 21, 2024) (Year: 2022).*

3GPP TSG-RAN WG1 #89; Hangzhou, China; Source: Ericsson; Title: On QCL (R1-1708710)—May 15-19, 2017 (cited on IDS of Feb. 21, 2024) (Year: 2017).*

Official Communication issued for Patent application No. Japanese Patent Application 2019-552286—Nov. 22, 2020 (cited on IDS of Feb. 21, 2024) (Year: 2020).*

3GPP TSG RAN WG1 Meeting #88; Athens, Greece Feb. 13-17, 2017; Source: NTT DOCOMO, Inc.; Title: Views on beam management framework; [ Agenda Item: 8.1.2.2.1 (R1-1702798) (cited on IDS of Feb. 21, 2024) (Year: 2017).*

Decision On Rejection issued for Chinese Application No. 201880033922.9—Aug. 31, 2023 (cited on IDS of Feb. 21, 2024) (Year: 2023).*

3GPP TSG RAN WG1 Meeting #88; Athens, Greece Feb. 13-17, 2017; Source: NTT DOCOMO Inc.; Title: Views [ on mechanism to recover from beam failure; Agenda Item: 8.1.2.2.2 (R1-1702799) (cited on IDS of Feb. 21, 2024) (Year: 2017).*

3GPP TSG RAN WG1 Meeting #88, Athens, Greece, Feb. 13-17, 2017; Source: CATT; Title: Beam management [ for control and data channel; Agenda Item: 8.1.2.2.1 (R1-1702076) (cited on IDS of Feb. 21, 2024) (Year: 2017).*

First Office Action of China National Intellectual Property Administration (CNIPA) for Application No. CN201880033922, issued on Oct. 32, 2022 (Translated) (Year: 2022).*

JP2016531495, Machine Translated using PE2E-SEARCH (Year: 2016).*

JP2015513237, Machine Translated using PE2E-SEARCH (Year: 2015).*

JP2016518752, Machine Translated using PE2E-SEARCH (Year: 2016).*

CN105308879, Machine Translated using PE2E-SEARCH (Year: 2016).*

3GPP TSG RAN WG1 Meeting #88; Athens, Greece; Source: ZTE, ZTE Microelectronics Title: QCL/QCB design for UL MIMO (R1-1701820)—Feb. 13-17, 2017.

3GPP TSG RAN WG1 Meeting #88; Athens Greece; Source: NTT Docomo, Inc.; Title: Views on beam management framework (R1-1702798)—Feb. 13-17, 2017.

(56) References Cited

OTHER PUBLICATIONS

PCT Notification of Transmittal of the International Search Report and the Written Opinion of the International Searching Authority, or the Declaration for International application No. PCT/SE2018/050302—dated Jun. 18, 2018.
Taiwan Office Action issued for Application No. 107109925—dated Jan. 8, 2019.
Chilean Office Action issued by the National Institute of Industrial Property—INAPI for Application No. Invention Patent PCT / 2019-002718—dated Sep. 17, 2020.
Official Action issued for Chinese Application No. 201880033922.9—Oct. 31, 2022.
3GPP TSG-RAN WG1 #89; Hangzhou, China; Source: Ericsson; Title: On QCL (R1-1708710)—May 15-19, 2017.
Official Communication issued for Patent application No. Japanese Patent Application 2019-552286—Nov. 22, 2020.
3GPP TSG RAN WG1 Meeting #88; Athens, Greece Feb. 13-17, 2017; Source: NTT DOCOMO, Inc.; Title: Views on beam management framework; Agenda Item: 8.1.2.2.1 (R1-1702798).
Decision On Rejection issued for Chinese Application No. 201880033922.9—Aug. 31, 2023.
3GPP TSG RAN WG1 Meeting #88; Athens, Greece Feb. 13-17, 2017; Source: NTT DOCOMO, Inc.; Title: Views on mechanism to recover from beam failure; Agenda Item: 8.1.2.2.2 (R1-1702799).
3GPP TSG RAN WG1 Meeting #88, Athens, Greece, Feb. 13-17, 2017; Source: CATT; Title: Beam management for control and data channel; Agenda Item: 8.1.2.2.1 (R1-1702076).

\* cited by examiner

US 12,052,075 B2

SYSTEMS AND METHODS FOR DETERMINING TRANSMITTER AND RECEIVER CONFIGURATIONS FOR A WIRELESS DEVICE

PRIORITY

This application is a continuation, under 35 U.S.C. § 120 of U.S. patent application Ser. No. 15/749,470 flied on Apr. 19, 2018 which is a U.S. National Stage Filing under 35 U.S.C. § 371 of International Patent Application Serial No. PCT/SE2018/050302 filed Mar. 23 2018, and entitled "Systems and Methods For Determining Transmitter And Receiver Configurations For A Wireless Device" which claims priority to U.S. Provisional Patent Application No. 62/476,657 filed Mar. 24 2017, all of which are hereby incorporated by reference in their entirety.

FIELD OF DISCLOSURE

The present disclosure relates generally to the field of communications, and in particular to determining transmitter and receiver configurations for a wireless device.

BACKGROUND

In 5th Generation mobile networks or wireless systems (5G) or 5G New Radio (NR), spatial quasi co-location (QCL) has been introduced as a new concept. Two transmitted reference signals from a transmitter (e.g., base station) are said to be spatially QCL at a receiver (e.g., UE or terminal) if the receiving spatial characteristics of the two received reference signals are the same or similar. Spatial characteristics may be one or more of the primary angle of arrival, the receiving angular spread of the signal, the spatial correlation, or any other parameter or definition that captures spatial characteristics. The two reference signals are sometimes denoted equivalently as being transmitted/received from/by two different antenna ports. If two transmitting antenna ports of a gNB (e.g., base station) are spatially QCL at the UE, the UE may use the same receiving (RX) beamforming weights to receive both the first and second reference signals.

The use of spatial QCL is of particular importance when the UE uses analog beamforming, since the UE has to know where to direct the analog beam before receiving the signal. Hence, for 5G NR, it is possible to signal from gNB to UE that a certain previously transmitted channel state information reference signal (CSI-RS) resource or CSI-RS antenna port is spatially QCL with a physical downlink shared channel (PDSCH) transmission and the PDSCH's demodulation reference signal (DMRS) transmission. With this information, the UE may use the same analog beam for the PDSCH reception as it used in the reception of the previous CSI-RS resource or antenna port.

The spatial QCL framework may also be extended to hold for transmissions from the UE. In this case, the transmitted signal from the UE is spatially QCL with a previous reception of a signal received by the UE. If the UE makes this assumption for the transmission, it means that the UE is transmitting back a signal in an analog transmit (TX) beam which is the same or similar to the RX beam previously used to receive a signal. Hence, the first Reference Signal (RS) transmitted from the gNB is spatially QCL at the UE with a second RS transmitted from the UE back to the gNB. This is useful in case the gNB uses analog beamforming since the gNB then knows from which direction to expect a transmission from the UE and may therefore adjust its beam direction just before the actual reception.

In 5G NR, a primary synchronization signal (PSS), a secondary synchronization signal (SSS), a physical broadcast channel (PBCH), and possibly a tertiary synchronization signal (TSS) will be used in a synchronization signal (SS) block. The SS block will likely span four orthogonal frequency division multiplex (OFDM) symbols. Multiples of such SS blocks may be transmitted on different beams in different beamforming directions, and thus each SS block may benefit from the antenna gain of the corresponding beam. The drawback is that multiple SS blocks require multiples of four OFDM symbols to be used to cover the whole gNB area with such beams. Further, the narrower the beam, the better the coverage per beam but the larger the overhead from transmitting SS blocks. Hence, there is a tradeoff between coverage and overhead. Also, SS block beams are wider than data beams, which may be very narrow to provide very high antenna gain in order to maximize the signal to interference plus noise ratio (SINR) at the receiver.

Furthermore, existing air interface solutions do not provide robust communications between a UE and a gNB when utilizing narrow beamforming such as in the millimeter wave frequencies. This is even more apparent with analog beamforming that requires knowing where to direct a beam. Since beams are very narrow (e.g., down to a few degrees in beam width) failure to direct this narrow beam in the right direction may lead to loss in connection and interruption in data throughput. Also, the UE may need to direct the beam in a robust manner when receiving synchronization signals and broadcast signals (e.g., common search space physical downlink control channel (PDCCH)) or transmitting physical random access channel (PRACH) or beam recovery signals while at the same time receiving and transmitting dedicated signals that require high gain or narrow beams (e.g., PDCCH, physical uplink shared channel (PUSCH), and UE-specific search space PDCCH). In addition, the UE may need to set the UE beam direction without dedicated beam indication signaling from gNB to UE. In an NR system, there is also a need to transmit both narrow and wide width beams, where narrow beams may be used for the transmission of unicast messages while wide beams may be used for the transmission of multicast or broadcast messages.

Accordingly, there is a need for improved techniques for determining transmitter and receiver configurations for a wireless device. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Systems and method of determining transmitter and receiver configurations for a wireless device are presented herein. According to one aspect, a method performed by a wireless device in a wireless communications system comprises transmitting or receiving, by the wireless device, a first signal of a first type using a first transmitter or receiver configuration based on a first QCL assumption associating the first signal with a first reference signal received by the wireless device. Further, the method includes transmitting or receiving, by the wireless device, a second signal of a second type using a second transmitter or receiver configuration based on a second QCL assumption associating the second signal with a second reference signal received by the wireless device.

According to another aspect, the first reference signal is a broadcasted reference signal and the second reference signal is a UE-specific configured reference signal.

According to another aspect, the broadcasted reference signal is a reference signal in an SS block and the UE-specific reference signal is a CSI-RS.

According to another aspect, the first signal is a common signal and the second signal is a UE-specific signal.

According to another aspect, the first and second signals are UE-specific signals.

According to another aspect, the first reference signal is a reference signal in a preferred SS block and the first signal is a common search space or a group common search space of a PDCCH.

According to another aspect, the second reference signal is a CSI-RS and the second signal is a DMRS for a UE-specific search space of a PDCCH.

According to another aspect, the second reference signal is a CSI-RS and the second signal is a UE-specific search space of a PDCCH.

According to another aspect, the second reference signal is an RS in a preferred SS block and the second signal is a PRACH signal or a beam failure recovery signal.

According to another aspect, the first reference signal is a reference signal in a preferred SS block and the first signal is a UE-specific search space of a PDCCH.

According to another aspect, the second reference signal is a CSI-RS and the second signal is a PUSCH signal.

According to another aspect, the second reference signal is a CSI-RS and the second signal is a PDSCH.

According to another aspect, the second reference signal is a CSI-RS and the second signal is a PUCCH signal.

According to another aspect, the first receiver configuration corresponds to a beam direction used to receive the first reference signal.

According to another aspect, the second transmitter or receiver configuration corresponds to a beam direction used to receive the second reference signal.

According to another aspect, the method includes determining the first transmitter or receiver configuration based on the first QCL assumption.

According to another aspect, the step of determining the first transmitter or receiver configuration includes determining a transmit precoder or receive beamforming weights to enable the transmission or reception of the first signal based on receive beamforming weights that enabled the reception of the first reference signal.

According to another aspect, the method includes determining the second transmitter or receiver configuration based on the second QCL assumption.

According to another aspect, the step of determining the second transmitter or receiver configuration includes determining a transmit precoder or receive beamforming weights to enable the transmission or reception of the second signal based on receive beamforming weights that enabled the reception of the second reference signal.

According to another aspect, the QCL assumption is a spatial QCL assumption.

According to another aspect, the method includes receiving, by the wireless device, from a network node, an indication of the first or second QCL assumption.

According to another aspect, the step of receiving the indication is by at least one of radio resource control (RRC) signaling, medium access control control element (MAC-CE) signaling, and downlink control information (DCI) signaling.

According to another aspect, the first or second QCL assumption is a spatial relation between a reference signal reception by a wireless device and a transmission of a signal of a certain type by that wireless device or a QCL reference between a reference signal reception by a wireless device and a reception of a signal of a certain type by that wireless device.

According to another aspect, the method includes receiving, by the wireless device, the first and second reference signals.

According to another aspect, the wireless device is a UE.

Accordingly to one aspect, a wireless device is configured to transmit or receive a first signal of a first type using a first transmitter or receiver configuration based on a first QCL assumption associating the first signal with a first reference signal received by the wireless device. Further, the wireless device is configured to transmit or receive a second signal of a second type using a second transmitter or receiver configuration based on a second QCL assumption associating the second signal with a second reference signal received by the wireless device.

Accordingly to one aspect, a wireless device comprises at least one processor and a memory. Further, the memory comprises instructions executable by the at least one processor whereby the wireless device is configured to transmit or receive a first signal of a first type using a first transmitter or receiver configuration based on a first QCL assumption associating the first signal with a first reference signal received by the wireless device. Further, the wireless device is configured to transmit or receive a second signal of a second type using a second transmitter or receiver configuration based on a second QCL assumption associating the second signal with a second reference signal received by the wireless device.

Accordingly to one aspect, a wireless device comprises a transmitting/receiving module for transmitting or receiving a first signal of a first type using a first transmitter or receiver configuration based on a first QCL assumption associating the first signal with a first reference signal received by the wireless device. Further, the transmitting/receiving module is configured for transmitting or receiving a second signal of a second type using a second transmitter or receiver configuration based on a second QCL assumption associating the second signal with a second reference signal received by the wireless device.

Accordingly to one aspect, a method performed by a wireless device in a wireless communications system, comprises obtaining one of a plurality of QCL assumptions, with each assumption associating a certain reference signal reception by a wireless device with a transmission or reception of a signal of a certain type by that wireless device. Further, the method includes transmitting or receiving a signal of a certain type using a transmitter or receiver configuration based on the received QCL assumption that associates that signal with a reference signal received by the wireless device.

According to another aspect, the step of obtaining includes receiving, from a network node, an indication of the one of the plurality of QCL assumptions.

According to another aspect, the indication includes a subset of QCL parameters. In one example, a set of QCL parameters includes average gain, average delay, delay spread, Doppler spread, Doppler shift, and spatial parameter.

According to one aspect, a wireless device is configured to obtain one of a plurality of QCL assumptions, with each assumption associating a certain reference signal reception by a wireless device with a transmission or reception of a signal of a certain type by that wireless device. Further, the wireless device is configured to transmit or receive a signal of a certain type using a transmitter or receiver configuration based on the received QCL assumption that associates that signal with a reference signal received by the wireless device.

According to one aspect, a wireless device comprises at least one processor and a memory. Further, the memory comprises instructions executable by the at least one processor whereby the wireless device is configured to obtain one of a plurality of QCL assumptions, with each assumption associating a certain reference signal reception by a wireless device with a transmission or reception of a signal of a certain type by that wireless device. Also, the wireless device is configured to transmit or receive a signal of a certain type using a transmitter or receiver configuration based on the received QCL assumption that associates that signal with a reference signal received by the wireless device.

According to one aspect, a wireless device comprises a QCL assumption obtaining module for obtaining one of a plurality of QCL assumptions. Further, each assumption associates a certain reference signal reception by a wireless device with a transmission or reception of a signal of a certain type by that wireless device. Also, the wireless device includes a transmitting/receiving module for transmitting or receiving a signal of a certain type using a transmitter or receiver configuration based on the received QCL assumption that associates that signal with a reference signal transmitted to the wireless device.

Accordingly to one aspect, a computer program, comprising instructions which, when executed on at least one processor of a wireless device, cause the at least one processor to carry out any of the methods described herein. Further, a carrier contains the computer program with the carrier being one of an electronic signal, optical signal, radio signal, or computer readable storage medium.

According to one aspect, a method performed by a network node in a wireless communications system comprises obtaining one of a plurality of QCL assumptions for a wireless device. Also, each assumption associates a certain reference signal reception by a wireless device with a transmission or reception of a signal of a certain type by that wireless device. The method includes transmitting, to the wireless device, an indication of the obtained QCL assumption.

According to another aspect, the step of obtaining includes determining the one of the plurality of QCL assumptions for the wireless device.

According to another aspect, the method includes transmitting or receiving, to or from the wireless device, a signal of a certain type based on the obtained QCL assumption that associates that signal with a reference signal transmitted by the network node to the wireless device.

According to another aspect, the plurality of QCL assumptions includes at least one of a spatial relation between a reference signal reception by a wireless device and a transmission of a signal of a certain type by that wireless device and a QCL reference between a reference signal reception by a wireless device and a reception of a signal of a certain type by that wireless device.

According to one aspect, a network node is configured to obtain one of a plurality of quasi co-location (QCL) assumptions for a wireless device, with each assumption associating a certain reference signal reception by a wireless device with a transmission or reception of a signal of a certain type by that wireless device. Further, the network node is configured to transmit, to the wireless device, an indication of the obtained QCL assumption.

According to one aspect, a network node comprises at least one processor and a memory. Also, the memory comprises instructions executable by the at least one processor whereby the network node is configured to obtain one of a plurality of QCL assumptions for a wireless device. Further, each assumption associates a certain reference signal reception by a wireless device with a transmission or reception of a signal of a certain type by that wireless device. In addition, the network node is configured to transmit, to the wireless device, an indication of the obtained QCL assumption.

According to one aspect, a network node comprises a QCL assumption obtaining module for obtaining one of a plurality of QCL assumptions for a wireless device. Each assumption associates a certain reference signal reception by a wireless device with a transmission or reception of a signal of a certain type by that wireless device. Further, the network node includes a transmitting module for transmitting, to the wireless device, an indication of the obtained QCL assumption.

According to one aspect, a computer program comprises instructions which, when executed on at least one processor of a network node, cause the at least one processor to carry out any of the methods described herein. Further, a carrier may contain the computer program with the carrier being one of an electronic signal, optical signal, radio signal, or computer readable storage medium.

BRIEF DESCRIPTION OF THE DRAWINGS

The present disclosure will now be described more fully hereinafter with reference to the accompanying drawings, on which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
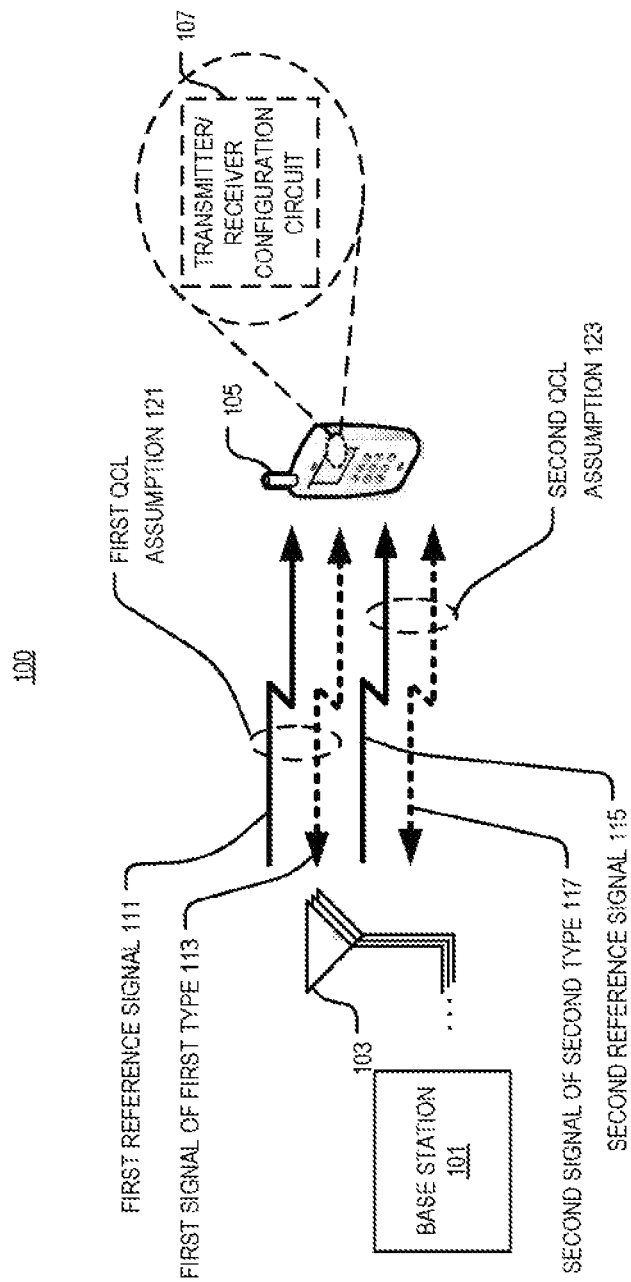
FIG. 1 illustrates one embodiment of a system for determining transmitter and receiver configurations for a wireless device in accordance with various aspects as described herein.

This disclosure includes describing systems and methods for determining transmitter and receiver configurations for a wireless device. For example, FIG. 1 illustrates one embodiment of a system 100 for determining transmitter and receiver configurations for a wireless device in accordance with various aspects as described herein. In FIG. 1, the system 100 may include a network node 101 (e.g., base station such as a gNB) and a wireless device 105 (e.g., UE). The network node 101 may include one or more antenna ports 103 (e.g., antenna array, transmission/reception points (TRP), or the like) that may transmit a first reference signal 111 (e.g., a broadcasted reference signal such as an SS block). The wireless device 105 may receive the first reference signal 111 using a certain receiver configuration (e.g., receive beamforming weights, receive spatial filtering weights, or the like). Further, the network node 101 may transmit or receive a first signal of a first type 113 (e.g., a common signal such as a common search space or a group common search space of a PDCCH). The wireless device 105 (e.g., UE) may transmit or receive the first signal of the first type 113 using a first transmitter configuration (e.g., transmit beamforming weights) or a first receiver configuration (e.g., receive beamforming weights) that is based on a first QCL assumption 121 associating the first signal 113 with the first reference signal 111 received by the wireless device 105. The transmit beamforming weights may also be referred to as a transmit precoder, transmit spatial filtering weights, or the like. Also, the receive beamforming weights may also be referred to as receive spatial filtering weights.

Furthermore, the wireless device 105 may determine the first receiver configuration based on the first QCL assumption 121. QCL may also be referred to as spatial QCL, reciprocal QCL, or the like. Further, QCL may be associated with a transmission or reception of a signal that is in a same beam direction as a transmission or reception of another signal. For instance, a QCL assumption may be a spatial relation between a reception of a reference signal (e.g., SS block, CSI-RS, or the like) by a wireless device and a transmission of a signal of a certain type (e.g., PDSCH, common or UE-specific PDCCH, PUCCH, PUSCH, or the like) by that wireless device. In another example, a QCL assumption may be a QCL reference between a reception of a reference signal by a wireless device and a reception of a signal of a certain type by that wireless device. In one example, a first reference signal is an SS block and the first signal is a UE-specific PDCCH with the second reference signal being a CSI-RS and the second signal being a PUCCH. In another example, a first reference signal is an SS block and the first signal is a UE-specific PDCCH with the second reference signal being a CSI-RS and the second signal being a PUSCH. The first receiver configuration may correspond to a same beam direction used to receive the first reference signal 111. The wireless device 105 may determine the first receiver configuration to enable the reception of the first signal 113 in a same beam direction as used to receive the first reference signal 111. For instance, the wireless device 105 may determine receive beamforming weights to enable the reception of the first signal 113 based on receive beamforming weights that enabled the reception of the first reference signal 111.

In this embodiment, the network node 101 may transmit a second reference signal 115 (e.g., a UE-specific configured reference signal). A UE-specific configured reference signal may be a CSI-RS, an RS in a preferred SS block, or the like. The wireless device 105 may receive the second reference signal 115 using a certain receiver configuration (e.g., receiver beamforming weights). Further, the network node 101 may transmit a second signal of a second type 117 (e.g., a UE-specific signal). A UE-specific signal may be a DMRS for a UE-specific search space of a PDCCH, a UE-specific search space of a PDCCH, a PRACH signal or a beam failure recovery signal, a PUSCH signal, a PDSCH, or the like. The wireless device 105 (e.g., UE) may receive the second signal of the second type 117 using a second receiver configuration (e.g., receiver beamforming weights) that is based on a second QCL assumption 123 associating the second signal 117 with the second reference signal 115 received by the wireless device 105. The wireless device 105 may determine the second receiver configuration based on the second QCL assumption 123. The second receiver configuration may correspond to a same beam direction used to receive the second reference signal 115. The wireless device 105 may determine the second receiver configuration to enable the reception of the second signal 117 in a same beam direction as used to receive the second reference signal 115. For instance, the wireless device 105 may determine receive beamforming weights to enable the reception of the second signal 117 based on receive beamforming weights that enabled the reception of the second reference signal 115.

In another embodiment, the network node 101 may obtain or determine one of a plurality of QCL assumptions 121, 123 for the wireless device 105. Each QCL assumption 121, 123 associates the certain reference signal reception 111, 115 by the wireless device 105 with the transmission or reception of the signal of the certain type 113, 117 by that wireless device 105. Further, the network node 101 transmits, to the wireless device 105, an indication of the determined QCL assumption 121, 123. The wireless device 105 receives this indication and then transmits or receives the signal of the certain type 113, 117 using the transmitter or receiver configuration based on the received QCL assumption 121, 123 that associates that signal 113, 117 with the reference signal 111, 115 received by the wireless device 105.

Additionally or alternatively, the network node 101 may be configured to support a wireless communication system (e.g., NR, LTE, LTE-NR, UMTS, GSM, or the like). Further, the network node 101 may be a base station (e.g., eNB, gNB), an access point, a wireless router, or the like. The network node 101 may serve wireless devices such as wireless device 105. The wireless device 105 may be configured to support a wireless communication system (e.g., NR, LTE, LTE-NR, UMTS, GSM, or the like). The wireless device 105 may be a UE, a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like.

Figure 2:
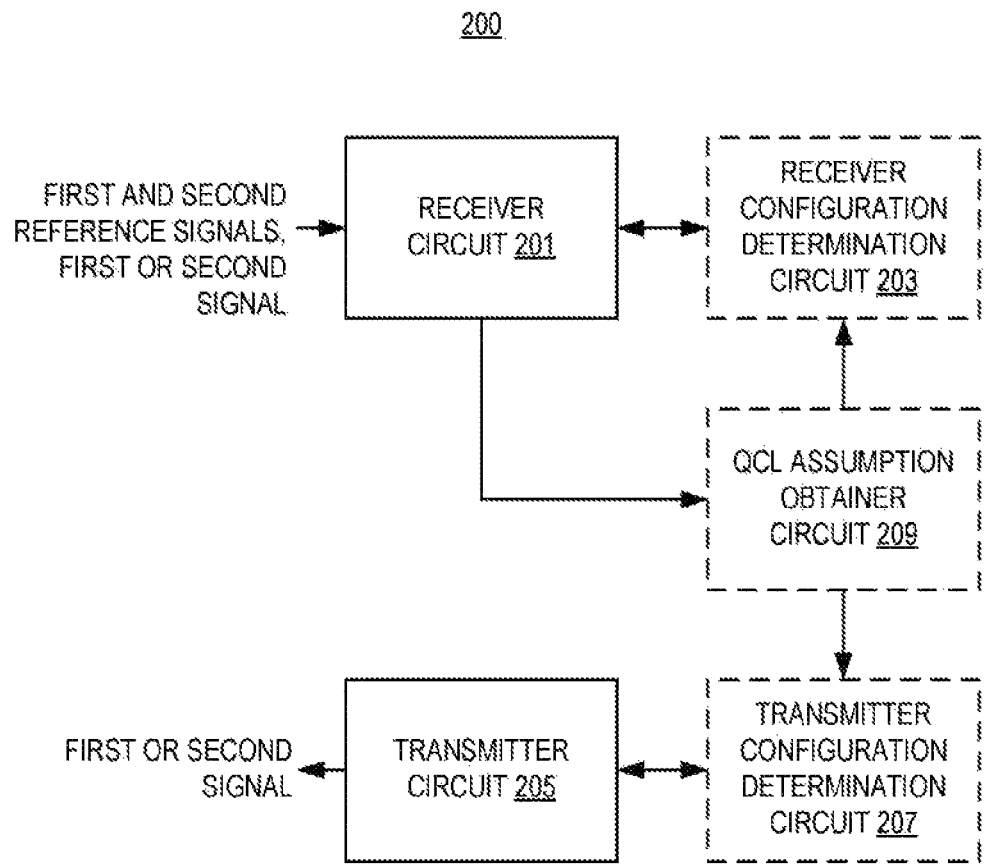
FIG. 2 illustrates one embodiment of a wireless device in accordance with various aspects as described herein.

FIG. 2 illustrates one embodiment of a wireless device 200 in accordance with various aspects as described herein. In FIG. 2, the wireless device 200 may include a receiver circuit 201, a receiver configuration determination circuit 203, a transmitter circuit 205, a transmitter configuration determination circuit 207, a QCL assumption obtainer circuit 209, the like, or any combination thereof. The receiver configuration determination circuit 203 may be configured to determine a first receiver configuration based on a first QCL assumption associating a first signal of a first type with a first reference signal received by the wireless device. The receiver circuit 201 may be configured to receive the first signal of the first type using the first receiver configuration based on the first QCL assumption. The receiver configuration determination circuit 203 may also be configured to determine a second receiver configuration based on a second QCL assumption associating a second signal of a second type with a second reference signal received by the wireless device 200. The receiver circuit 201 may also be configured to receive the second signal of the second type using the second receiver configuration based on the second QCL assumption. In addition, the transmitter configuration determination circuit 207 may be configured to determine a second transmitter configuration based on the second QCL assumption. The transmitter circuit 205 may be configured to transmit the first signal of the first type using the first transmitter configuration based on the first QCL assumption. The transmitter circuit 205 may also be configured to transmit the second signal of the second type using the second transmitter configuration based on the second QCL assumption. The QCL assumption obtainer circuit 209 may be configured to obtain one of a plurality of QCL assumptions. The receive circuit 201 may also be configured to receive an indication of the one of the plurality of QCL assumptions.

Figures 3A, 3B:
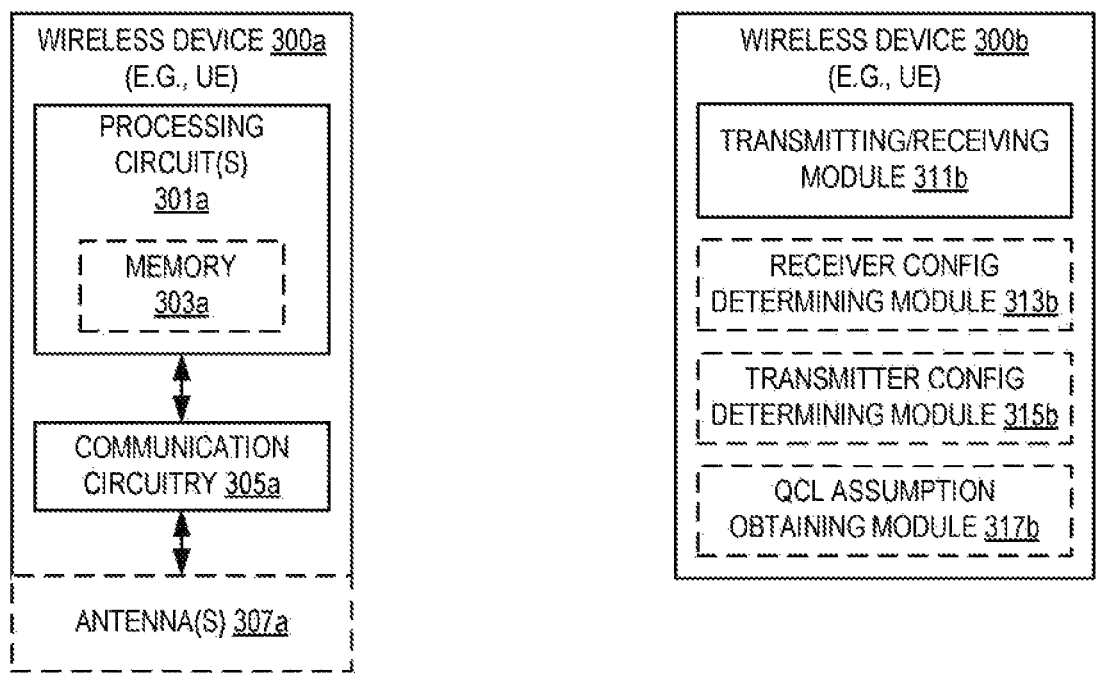
FIGS. 3A-B illustrate other embodiments of a wireless device in accordance with various aspects as described herein.

FIGS. 3A-B illustrate other embodiments of a wireless device 300a-b in accordance with various aspects as described herein. In FIG. 3A, the wireless device 300a (e.g., UE) may include processing circuit(s) 301a, radio frequency (RF) communications circuit(s) 305a, antenna(s) 307a, the like, or any combination thereof. The communication circuit(s) 305a may be configured to transmit or receive information to or from one or more network nodes via any communication technology. This communication may occur using the one or more antennas 307a that are either internal or external to the wireless device 300a. The processing circuit(s) 301a may be configured to perform processing as described herein (e.g., the methods of FIGS. 4, 6, and 7) such as by executing program instructions stored in memory 303a. The processing circuit(s) 301a in this regard may implement certain functional means, units, or modules.

In FIG. 3B, the wireless device 300b may implement various functional means, units, or modules (e.g., via the processing circuit(s) 301a in FIG. 3A or via software code). These functional means, units, or modules (e.g., for implementing the methods of FIGS. 4, 6, and 7) may include a transmitting/receiving unit or module 311b for transmitting/receiving a signal of a certain type using a transmitter/receiver configuration based on a first QCL assumption associating the signal with a reference signal received by the wireless device. Further, these functional means, units, or modules may include a receiver configuration determination unit or module 313b for determining a receiver configuration based on a QCL assumption. Also, these functional means, units, or modules may include a transmitter configuration determining unit or module 315b for determining a transmitter configuration based on a QCL assumption. Finally, these functional means, units, or modules may include a QCL assumption obtaining module 317b for obtain one of a plurality of QCL assumptions.

Figure 4:
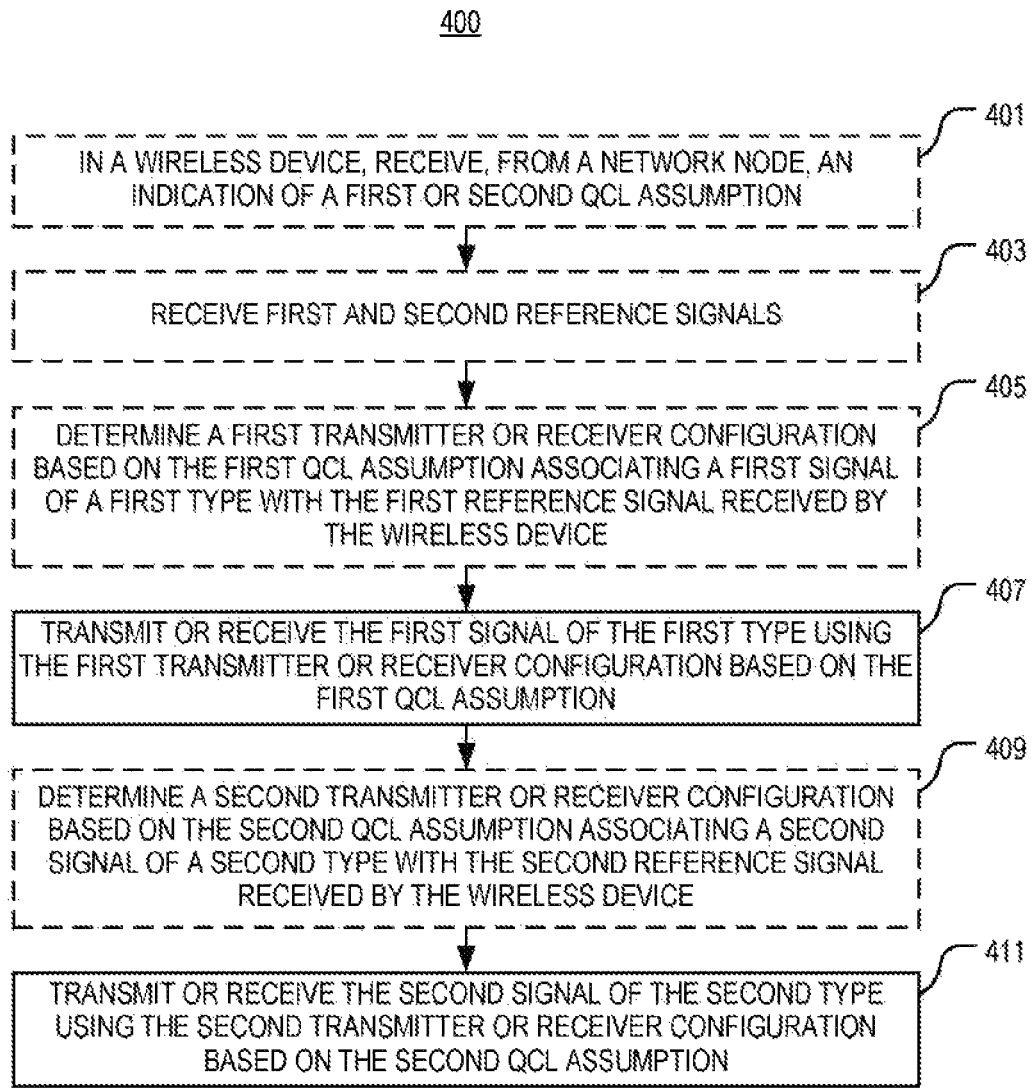
FIG. 4 illustrates one embodiment of a method for determining transmitter and receiver configurations for a wireless device in a wireless communication system in accordance with various aspects as described herein.

FIG. 4 illustrates one embodiment of a method 400 for determining transmitter and receiver configurations for a wireless device in a wireless communication system in accordance with various aspects as described herein. The wireless device performing this method 400 may correspond to any of the wireless devices 105, 200, 300a, 300b, 500, 605 described herein. In FIG. 4, the method 400 may start, for instance, at block 401 where it may include receiving, from a network node, an indication of a first or second QCL assumption. Further, the method 400 may include receiving first and second reference signals, as referenced by block 403. At block 405, the method 400 may include determining a first receiver configuration based on a first QCL assumption associating a first signal of a first type with the first reference signal received by the wireless device. At block 407, the method 400 includes transmitting or receiving the first signal of the first type using the first transmitter or receiver configuration based on the first QCL assumption. At block 409, the method 400 may include determining a second transmitter or receiver configuration based on a second QCL assumption associating a second signal of a second type with the second reference signal received by the wireless device. At block 411, the method 400 includes transmitting or receiving the second signal of the second type using the second transmitter or receiver configuration based on the second QCL assumption.

Figure 5:
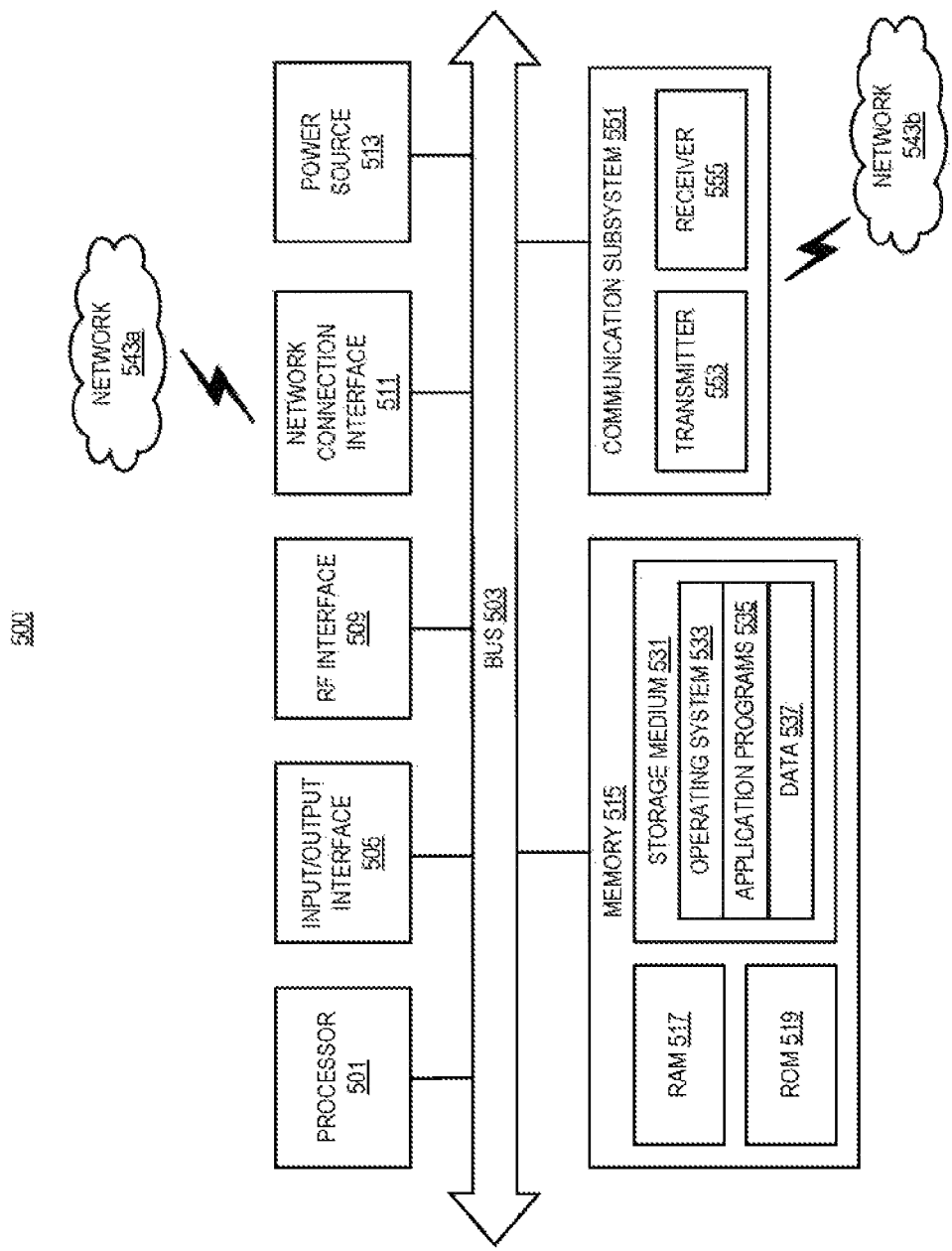
FIG. 5 illustrates another embodiment of a wireless device in accordance with various aspects as described herein.

FIG. 5 illustrates another embodiment of a wireless device in accordance with various aspects as described herein. In some instances, the wireless device 500 may be referred as a UE, an MS, a terminal, a cellular phone, a cellular handset, a PDA, a smartphone, a wireless phone, an organizer, a handheld computer, a desktop computer, a laptop computer, a tablet computer, a set-top box, a television, an appliance, a game device, a medical device, a display device, a metering device, or some other like terminology. In other instances, the wireless device 500 may be a set of hardware components. In FIG. 5, the wireless device 500 may be configured to include a processor 501 that is operatively coupled to an input/output interface 505, a radio frequency (RF) interface 509, a network connection interface 511, a memory 515 including a random access memory (RAM) 517, a read only memory (ROM) 519, a storage medium 531 or the like, a communication subsystem 551, a power source 533, another component, or any combination thereof. The storage medium 531 may include an operating system 533, an application program 535, data 537, or the like. Specific devices may utilize all of the components shown in FIG. 5, or only a subset of the components, and levels of integration may vary from device to device. Further, specific devices may contain multiple instances of a component, such as multiple processors, memories, transceivers, transmitters, receivers, etc. For instance, a computing device may be configured to include a processor and a memory.

In FIG. 5, the processor 501 may be configured to process computer instructions and data. The processor 501 may be configured as any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. For example, the processor 501 may include two computer processors. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 505 may be configured to provide a communication interface to an input device, output device, or input and output device. The wireless device 500 may be configured to use an output device via the input/output interface 505. A person of ordinary skill will recognize that an output device may use the same type of interface port as an input device. For example, a USB port may be used to provide input to and output from the wireless device 500. The output device may be a speaker, a sound card, a video card, a display, a monitor, a printer, an actuator, an emitter, a smartcard, another output device, or any combination thereof. The wireless device 500 may be configured to use an input device via the input/output interface 505 to allow a user to capture information into the wireless device 500. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processor. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, the RF interface 509 may be configured to provide a communication interface to RF components such as a transmitter, a receiver, and an antenna. The network connection interface 511 may be configured to provide a communication interface to a network 543a. The network 543a may encompass wired and wireless communication networks such as a local-area network (LAN), a wide-area network (WAN), a computer network, a wireless network, a telecommunications network, another like network or any combination thereof. For example, the network 543a may be a Wi-Fi network. The network connection interface 511 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 517 may be configured to interface via the bus 503 to the processor 501 to provide storage or caching of data or computer instructions during the execution of software programs such as the operating system, application programs, and device drivers. In one example, the wireless device 500 may include at least one hundred and twenty-eight megabytes (128 Mbytes) of RAM. The ROM 519 may be configured to provide computer instructions or data to the processor 501. For example, the ROM 519 may be configured to be invariant low-level system code or data for basic system functions such as basic input and output (I/O), startup, or reception of keystrokes from a keyboard that are stored in a non-volatile memory. The storage medium 531 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 531 may be configured to include an operating system 533, an application program 535 such as a web browser application, a widget or gadget engine or another application, and a data file 537.

In FIG. 5, the processor 501 may be configured to communicate with a network 543b using the communication subsystem 551. The network 543a and the network 543b may be the same network or networks or different network or networks. The communication subsystem 551 may be configured to include one or more transceivers used to communicate with the network 543b. The one or more transceivers may be used to communicate with one or more remote transceivers of another wireless device such as a base station of a radio access network (RAN) according to one or more communication protocols known in the art or that may be developed, such as IEEE 802.xx, CDMA, WCDMA, GSM, LTE, NR, NB IoT, UTRAN, WiMax, or the like.

In another example, the communication subsystem 551 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, NR, NB IoT, UTRAN, WiMax, or the like. Each transceiver may include a transmitter 553 or a receiver 555 to implement transmitter or receiver functionality, respectively, appropriate to the RAN links (e.g., frequency allocations and the like). Further, the transmitter 553 and the receiver 555 of each transceiver may share circuit components, software, or firmware, or alternatively may be implemented separately.

In the current embodiment, the communication functions of the communication subsystem 551 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 551 may include cellular communication, Wi-Fi communication, Bluetooth communication, and GPS communication. The network 543*b* may encompass wired and wireless communication networks such as a local-area network (LAN), a wide-area network (WAN), a computer network, a wireless network, a telecommunications network, another like network or any combination thereof. For example, the network 543*b* may be a cellular network, a Wi-Fi network, and a near-field network. The power source 513 may be configured to provide an alternating current (AC) or direct current (DC) power to components of the wireless device 500.

In FIG. 5, the storage medium 531 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a BluRay optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 531 may allow the wireless device 500 to access computer-executable instructions, application programs or the like, stored on transitory or non-transitory memory media, to off-load data, or to upload data. An article of manufacture, such as one utilizing a communication system may be tangibly embodied in storage medium 531, which may comprise a computer-readable medium.

The functionality of the methods described herein may be implemented in one of the components of the wireless device 500 or partitioned across multiple components of the wireless device 500. Further, the functionality of the methods described herein may be implemented in any combination of hardware, software or firmware. In one example, the communication subsystem 551 may be configured to include any of the components described herein. Further, the processor 501 may be configured to communicate with any of such components over the bus 503. In another example, any of such components may be represented by program instructions stored in memory that when executed by the processor 501 performs the corresponding functions described herein. In another example, the functionality of any of such components may be partitioned between the processor 501 and the communication subsystem 551. In another example, the non-computative-intensive functions of any of such components may be implemented in software or firmware and the computative-intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

In one embodiment, the UE identifies multiple types of downlink transmitted RSs and associates each transmitted data signal (i.e., from gNB or UE) to be spatially QCL at the UE (i.e., the UE should use a certain RX beam) depending on the associated RS types. As one example, the broadcasted synchronization signal (SS block) and the UE specifically configured CSI-RS are two RS types. When receiving the common search space PDCCH, the UE may assume the same analog RX beam as when it received the preferred SS block. When receiving the UE specific search space PDCCH, the UE may assume the same analog RX beam as when it received a certain configured CSI-RS.

In one embodiment, the UE may utilize that the transmitted or received signal to be spatially QCL (e.g., used to determine receive beam direction) with different types of reference signals transmitted from the gNB, depending on the type (e.g. common control, UE specific control, dedicated data) of transmitted signal. QCL assumptions for receiving control channels may include the following:

for receiving common search space PDCCH, the UE may assume that the PDCCH DMRS is spatially QCL on the receiver (UE) side with a RS belonging to a preferred and detected SS block; and for receiving UE specific search space PDCCH, the UE may assume that the PDCCH DMRS is spatially QCL on the receiver (UE) side with a configured CSI-RS.

QCL assumptions for transmitting control channels may include:

for transmitting PRACH or beam failure recovery signals, the UE should transmit in such a way that the transmitted signal is spatially QCL on the UE side with a RS belonging to a preferred and detected SS block QCL assumptions for transmitting and receiving data channels may include:

for transmitting PUSCH or receiving PDSCH, the UE should transmit or receive in such a way that the signal is spatially QCL on the UE side with a configured CSI-RS One advantage of this solution is that the UE always knows how to direct its beam when receiving and transmitting. This avoids the need for beam sweeping (i.e., searching for the signal by probing in different directions), which is costly in overhead and increases latency. Hence, this solution reduces latency and overhead in an NR network.

The gNB or transmission/reception points (TRPs) connected to a gNB transmits one or multiple SS blocks in a broadcasted manner. In case of multiple SS blocks, each SS block may only cover a portion of the gNB coverage area. The UE detects one of the SS blocks (e.g., in a transmit beam from the gNB) using a receiver configuration and responds with a random access channel (e.g., PRACH) transmission using a transmitter configuration that is similar to the receiver configuration. These configurations may be seen as beams, created by an analog beamforming network in the UE. Hence, the UE receives an SS block using an analog RX beam and then transmits the PRACH in the same beam (TX beam). One way to describe this behavior is the state that the selected, or preferred SS block is spatially QCL at the UE with the PRACH transmission.

Spatial QCL may be defined as having the same or essentially similar direction of arrival/departure or having the same or essentially similar spatial covariance coefficients.

SS blocks have typically a wide to medium beam width so that the gNB coverage area may be covered with a few such SS block transmissions, to avoid excessive overhead. Thus, each SS block/beam covers multiple UEs typically, while for dedicated and UE-specific beams, one may configure CSI-RS. These CSI-RSs may be transmitted in very narrow beams, targeting a single UE, have high gain and used to transmit very high data rate to (or receive from) the UE.

A wider beam width implies greater robustness but lower antenna gain compared to a narrow beam width.

For transmitted data or control from the gNB (e.g., PDSCH or PDCCH, respectively) it is beneficial for the UE if it knows the spatial QCL assumption relative to a previously transmitted signal or channel so that it may adjust its receiver configuration such as analog RX beam.

Likewise, for transmitted data or control from the UE (e.g., PUSCH, PRACH, PUCCH or beam failure recovery signal), it is beneficial for the gNB if it knows the spatial QCL assumption relative to a previously transmitted signal or channel from gNB so that it may adjust its receiver configuration such as analog RX beam.

It is observed that some transmitted control channels are of broadcast nature and some of dedicated nature, for a given UE. Also, broadcasted signals are more robust and may require less antenna gain. Broadcasted signals are also targeting multiple UEs, so narrow beams should be avoided.

In one embodiment, a UE utilizes each transmitted or received second signal at the UE to be QCL (primarily spatially to e.g., used to determine receive or transmit beam direction) with one of at least two different types of a first signals transmitted from the gNB.

The first type of signal may be PSS or SSS. PBCH, TSS, or a combination of these in a synchronization signal block of signals (SS block)

The second type of signal may be a PDCCH (and its associated DMRS) (either in group common, common or UE specific search space respectively) or PDSCH (and its associated DMRS) in the downlink and PUSCH (and its associated DMRS), PUCCH (and its associated DMRS) (short PUCCH or long PUCCH respectively), PRACH or beam recovery signal in the uplink.

The UE utilizes the QCL association with the first signal to adjust the receiver configuration such as the analog beamforming, or transmitter configuration also in form of analog beamforming to receive or transmit the second signal.

In one embodiment, the UE makes the QCL association following specified rules depending on the types of first and second signals; hence, without explicit signaling of which signal of a first type is associated with a signal of a second type.

In another embodiment, the UE uses the default QCL association following specified rules depending on the types of first and second signals; hence, without explicit signaling of which signal of a first type is associated with a signal of a second type until the UE has been explicitly configured a dedicated signal of the first type to use as QCL association for a given signal of the second type.

Here follows some more detailed embodiments:

For receiving common search space or group common search space PDCCH transmitted from gNB or TRP as the second type of signal, the UE may assume that the PDCCH DMRS is spatially QCL on the receiver (UE) side with a first type of signal, as an RS belonging to a preferred and detected SS block. It is assumed that the UE has detected a SS block, possible among multiple transmitted SS blocks from the gNB that may be transmitted from different TRPs and/or different beam directions from a TRP. This is denoted the preferred SS block. The network transmits this PDCCH in the same or in a similar beam as it transmitted the SS block 2, so that the UE may use the same RX beam to receive common search space PDCCH as it used to receive SS block 2.

For receiving UE specific search space PDCCH transmitted from gNB or TRP as a second type of signal, the UE may assume that the PDCCH DMRS as a first type if signal is spatially QCL on the receiver (UE) side with a configured CSI-RS. It is assumed that the UE is configured or triggered to measure on a CSI-RS resource and that CSI-RS resource is then used as a first type of signal. The network transmits the PDCCH in the same or similar beam as it previously transmitted the CSI-RS so that the UE may use the same RX beam to receive PDCCH as it received the CSI-RS.

In a further embodiment, the UE uses a QCL association rule such that for receiving UE specific search space PDCCH transmitted from gNB or TRP as a second type of signal, the UE may assume spatial QCL with a synchronization block of signals as an initial first type of signal, and then upon the network (re-)configuring the UE to measure and report signal quality based on a CSI-RS resource, the UE may assume spatial QCL with the configured CSI-RS as a different first type of signal.

In the above embodiment, the UE may assume the initial first type of signal as default, without explicit configuration after initial access and until further notice, that is, until configured otherwise.

For transmitting PRACH or beam failure recovery signals as a second type of signal from UE to gNB, the UE should transmit in such a way that the transmitted signal is spatially QCL on the UE side with a RS belonging to a preferred and detected SS block similar to the embodiment described above. The UE thus transmits in the same beam as it used to receive the SS block and the network may then use the same beam to receive the PRACH as it used to receive the SS block. Alternatively, the SS block to use for the spatial QCL assumption for PRACH or beam failure recovery signal may be explicitly signaled to the UE from the gNB in a configuration message.

For transmitting PUSCH or receiving PDSCH as a second type of signal, the UE should transmit or receive in such a way that the signal is spatially QCL on the UE side with a configured CSI-RS as a first type of signal, where CSI-RS is similar as to described in the embodiment above.

Figure 6:
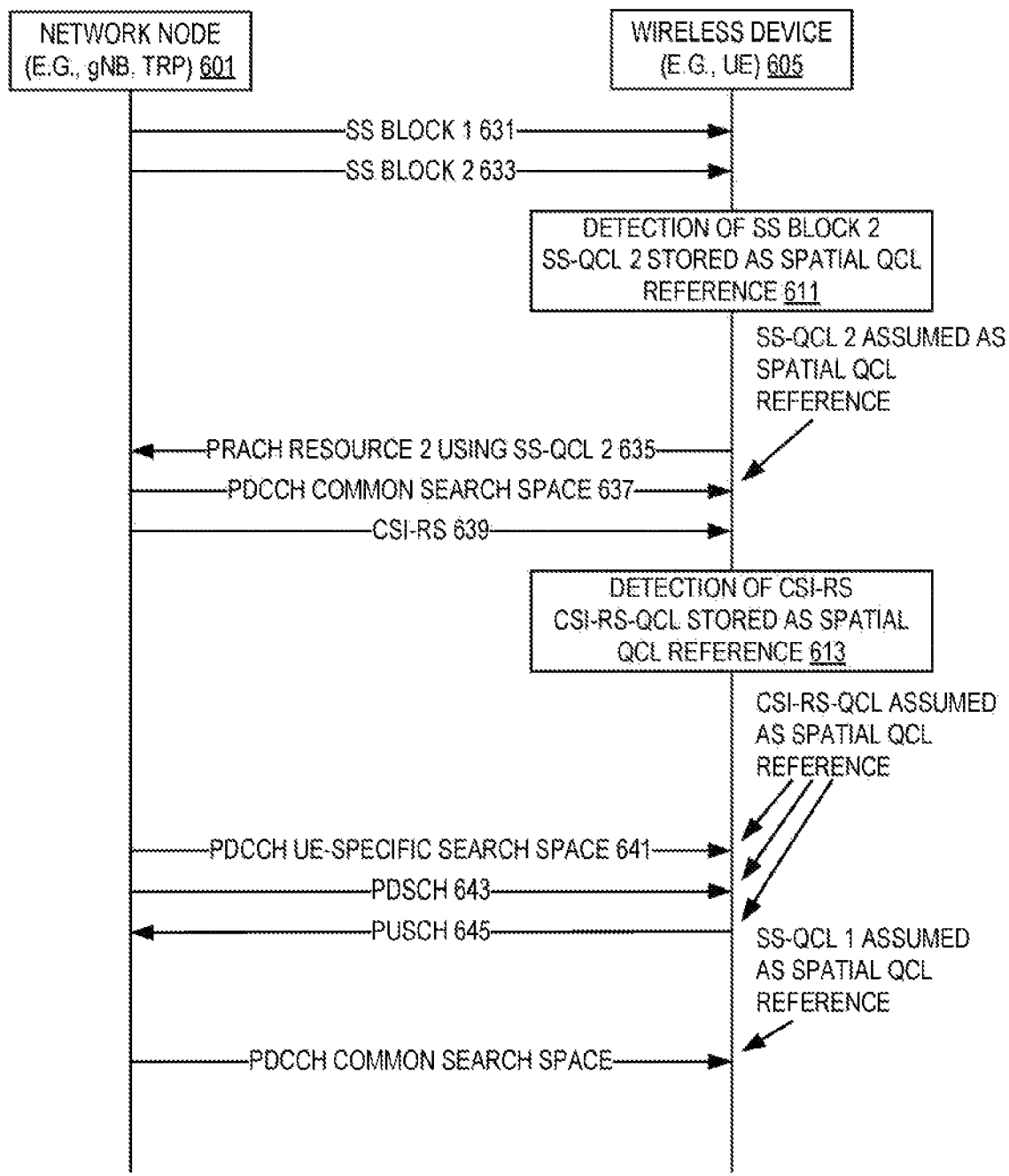
FIG. 6 illustrates another embodiment of a method for determining transmitter and receiver configurations for a wireless device in a wireless communication system in accordance with various aspects as described herein.

FIG. 6 illustrates another embodiment of a method 600 for determining transmitter and receiver configurations for a wireless device in a wireless communication system in accordance with various aspects as described herein. In FIG. 6, a network node 601 (e.g, gNB, TRP, or the like) transmits two SS blocks 631, 633, and a wireless device 605 (e.g., UE) detects SS block 2 633 as the preferred block (it may detect both but prefers SS block 2 as it has higher received power), as represented by block 611.

In FIG. 6, the UE 605 then transmits PRACH in PRACH resource 2 635, which is linked to SS block 2 (similarly SS block 1 has a different PRACH resource 1 to be used in case the UE prefers SS block 1). From receiving PRACH in resource 2 635, the network node 601 knows that the preferred SS block is block 2 633 for the UE. The UE 605 stores the analog beam used to receive SS block 2 633 as spatial QCL information "SS-QCL2."

The network node 601 then transmits PDCCH in the common search space 637 to the UE 605 using the same or similar beam as it used to transmit SS block 2 633 and the UE 605 uses the "SS-QCL2" information to receive the common search space PDCCH 637.

The common search space PDCCH 637 may schedule a PDSCH (not shown in the figure) that contains configuration information for the PDCCH UE-specific search space 641 and for CSI-RS resources 639 to use for CSI or beam management measurements. The UE 605 may feedback such measurements using PUCCH or PUSCH (not shown in figure) and will in this case use the SS-QCL2 assumption for the PUCCH or PUSCH transmissions. Hence, the network node 601 knows in which RX beam to expect the uplink transmission from the UE 605. Likewise, the PDSCH 643 that carries the configuration information mentioned above may also be transmitted assuming SS-QCL2 assumption so that the UE may configure the RX beam to use for the reception.

After the network node 601 has configured the UE 605 with a CSI-RS to use for UE specific search space PDCCH, PUSCH, and PDSCH, the CSI-RS 639 will be used as spatial QCL reference for those signals instead of the SS-QCL2. Hence, when receiving those signals, the UE 605 will use the same or similar RX beam as it used to receive the CSI-RS 639. Additionally, when transmitting PUSCH 645, the UE 605 will use the TX beam associated with the CSI-RS 639.

At this stage, the UE 605 will use two spatial QCL assumptions, depending on which signal to receive or transmit. These QCL assumptions are SS-QCL2 and CSI-RS, respectively. The UE will alternate between using these two different spatial QCL assumptions depending on the signal type to receive or transmit.

Figure 7:
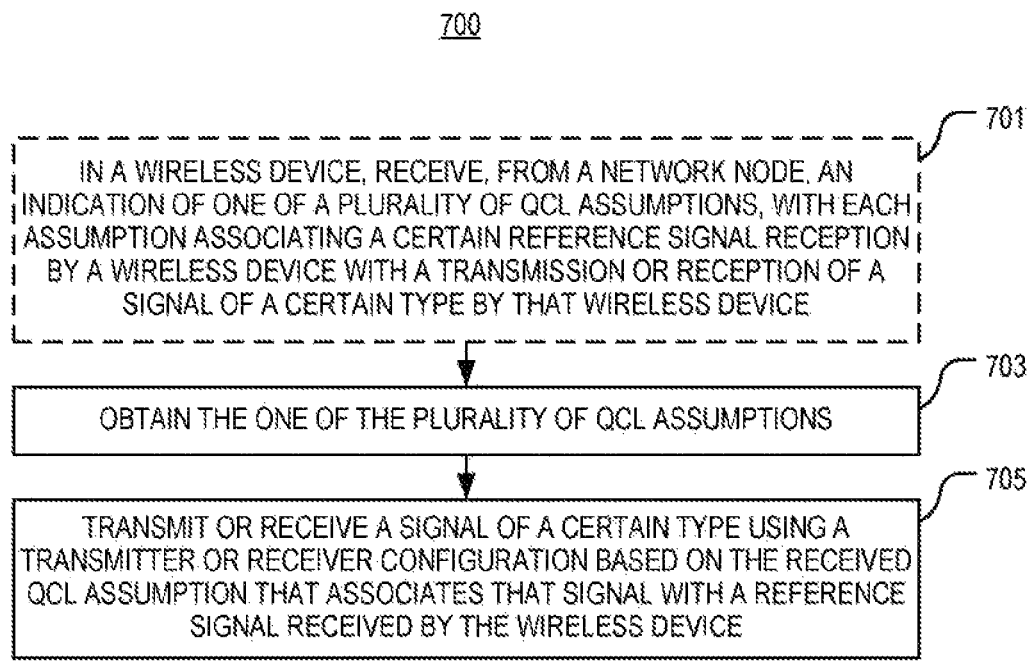
FIG. 7 illustrates another embodiment of a method for determining transmitter and receiver configurations for a wireless device in a wireless communication system in accordance with various aspects as described herein.

FIG. 7 illustrates another embodiment of a method 700 for determining transmitter and receiver configurations for a wireless device (e.g., UE) in a wireless communication system (e.g., 5G NR) in accordance with various aspects as described herein. In FIG. 7, the method 700 may start, for instance, at block 701 where it may include receiving, from a network node (e.g., gNB), an indication of one of a plurality of QCL assumptions. Further, each QCL assumption associates a certain reference signal reception by a wireless device with a transmission or reception of a signal of a certain type by that wireless device. At block 703, the method 700 includes obtaining the one of the plurality of QCL assumptions. Also, the method 700 includes transmitting or receiving a signal of a certain type using a transmitter or receiver configuration based on the received QCL assumption that associates that signal with a reference signal received by the wireless device, as represented by block 705.

Figure 8:
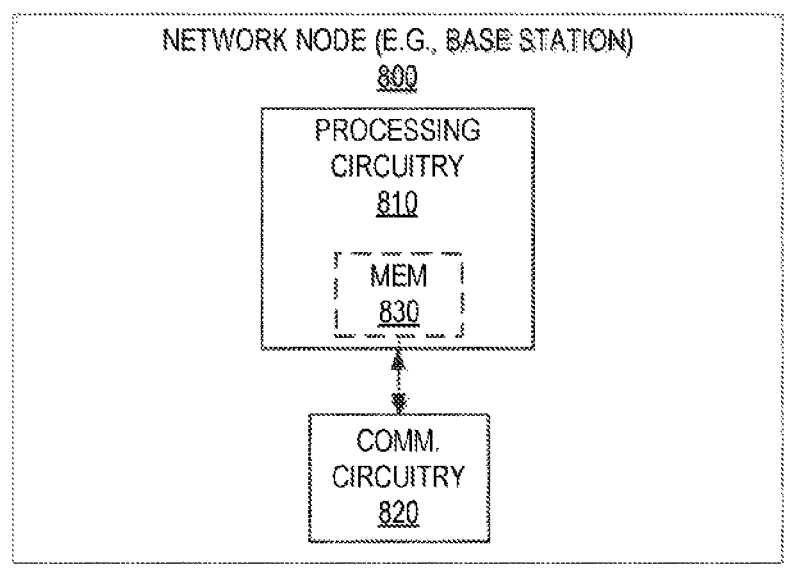
FIG. 8 illustrates one embodiment of a network node 800 as implemented in accordance with various embodiments as described herein.

FIG. 8 illustrates a network node 800 as implemented in accordance with various embodiments as described herein.

As shown, the network node 800 includes processing circuitry 810 and communication circuitry 820. The communication circuitry 820 is configured to transmit and/or receive information to and/or from one or more other nodes, e.g., via any communication technology. The processing circuitry 810 is configured to perform processing described above, such as by executing instructions stored in memory 830. The processing circuitry 810 in this regard may implement certain functional means, units, or modules.

Figure 9:
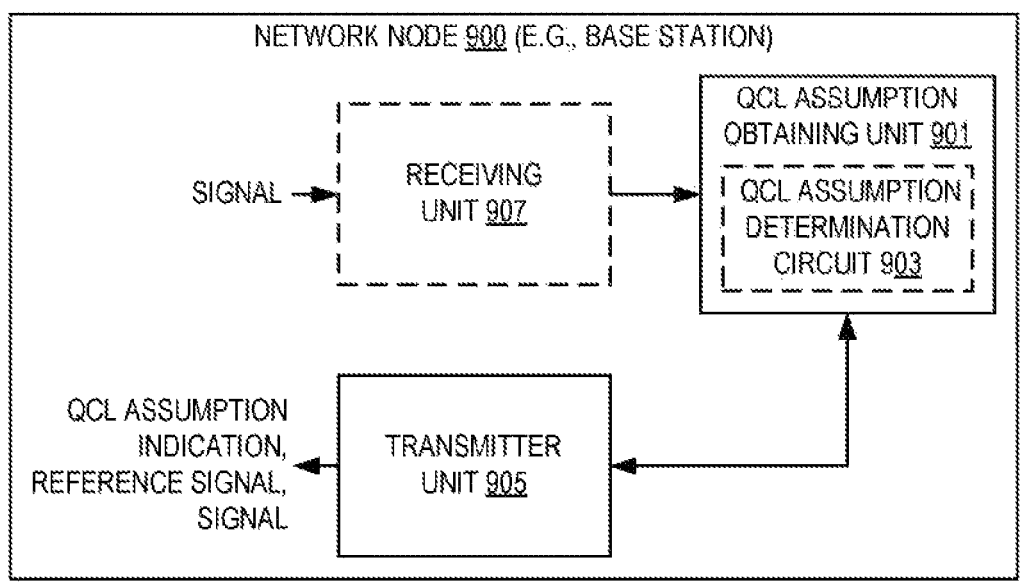
FIG. 9 illustrates a schematic block diagram of one embodiment of a network node in a wireless network in accordance various embodiments as described herein.

FIG. 9 illustrates a schematic block diagram of one embodiment of a network node 900 in a wireless network in accordance various embodiments as described herein (for example, the network node shown in FIGS. 1 and 6). In FIG. 9, the network node 900 implements various functional means, units, or modules (e.g., via the processing circuitry 810 in FIG. 8 and/or via software code). In one embodiment, these functional means, units, or modules (e.g., for implementing the method(s) herein) may include for instance: a QCL assumption obtaining unit 901 for obtaining one of a plurality of QCL assumptions; a QCL assumption determining unit 903 for determining the one of the plurality of QCL assumptions for the wireless device; a transmitting unit 905 for transmitting, to the wireless device, an indication of the obtained QCL assumption or a signal of a certain type based on the obtained QCL assumption that associates that signal with a reference signal transmitted by the network node to the wireless device; and a receiving unit 907 for receiving, from the wireless device, a signal of a certain type based on the obtained QCL assumption that associates that signal with a reference signal transmitted by the network node to the wireless device.

Figure 10:
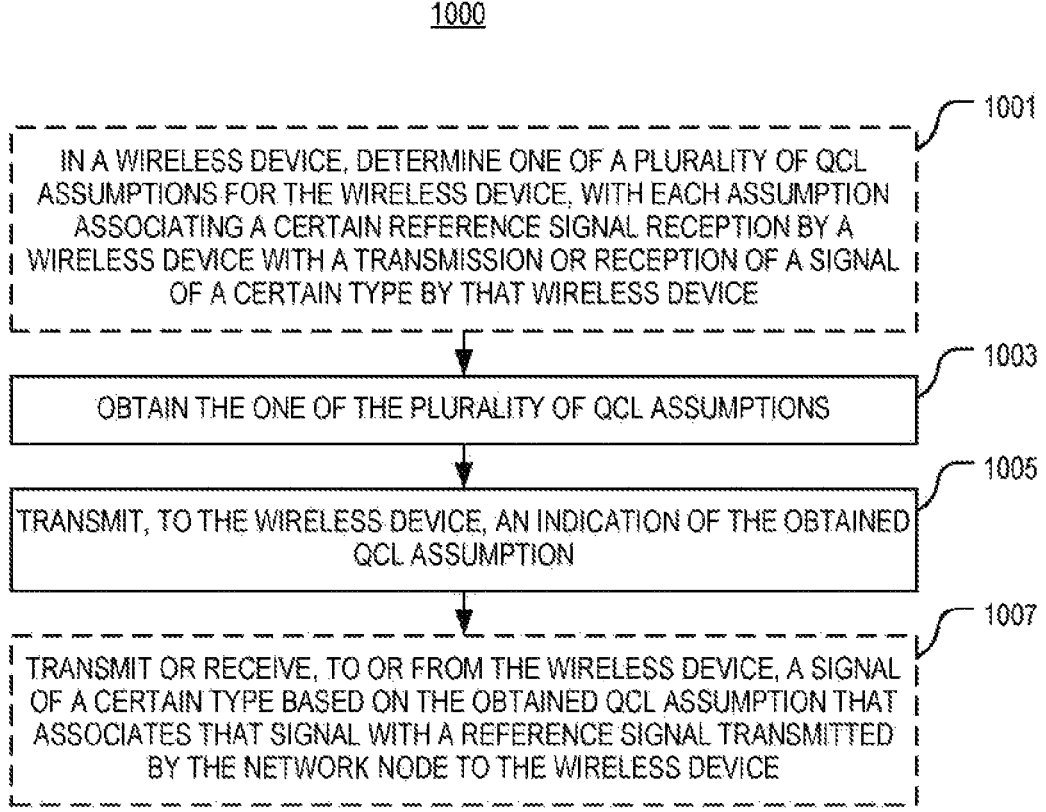
FIG. 10 illustrates one embodiment of a method performed by a network node for selecting a cell for transmitting control information in accordance with various embodiments as described herein.

FIG. 10 illustrates one embodiment of a method 1000 performed by a network node for selecting a cell for transmitting control information in accordance with various embodiments described herein. In FIG. 10, the method 1000 may start, for instance, at block 1001 where it may include determining one of a plurality of QCL assumptions for the wireless device. Further, each assumption associates a certain reference signal reception by a wireless device with a transmission or reception of a signal of a certain type by that wireless device. Also, the method 1000 includes obtaining the one of the plurality of QCL assumptions, as represented by block 1003. At block 1005, the method 1000 includes transmitting, to the wireless device, an indication of the obtained QCL assumption. In response, the method 1000 may include transmitting or receiving, to or from the wireless device a signal of a certain type based on the obtained QCL assumption that associates that signal with a reference signal transmitted by the network node to the wireless device, as represented at block 1007.

Beam Management:

In NR, different system requirements associated with QCL may be applied. In a first example, an indication of QCL between the antenna ports of two CSI-RS resources is supported. By default, no QCL may be assumed between antenna ports of two CSI-RS resources. Partial QCL parameters (e.g., only spatial QCL parameter at UE side) may be considered. For downlink, NR supports CSI-RS reception with and without beam-related indication. When a beam-related indication is provided, information pertaining to UE-side beamforming/receiving procedure used for CSI-RS-based measurement may be indicated through QCL to UE. Further, QCL information includes spatial parameter(s) for UE-side reception of CSI-RS ports.

In a second example, NR-PDCCH transmission supports robustness against beam pair link blocking. A UE can be configured to monitor NR-PDCCH on M beam pair links simultaneously, where M≥1. The maximum value of M may depend at least on UE capability. Also, a UE may choose at least one beam out of M for NR-PDCCH reception. A UE can be configured to monitor NR-PDCCH on different beam pair link(s) in different NR-PDCCH OFDM symbols. NR-PDCCH on one beam pair link may be monitored with shorter duty cycle than other beam pair link(s). This configuration may apply to scenarios where a UE may not have multiple RF chains. Parameters related to UE Rx beam setting for monitoring NR-PDCCH on multiple beam pair links are configured by higher layer signaling or Medium Access Control (MAC) Control Element (CE) or considered in the search space design.

In a third example, for reception of a unicast DL data channel, an indication of a spatial QCL assumption between DL RS antenna port(s) and DMRS antenna port(s) of DL data channel is supported. Information indicating the RS antenna port(s) is indicated via Downlink Control Information (DCI) (downlink grants). The information indicates the RS antenna port(s) which is QCL'ed with DMRS antenna port(s). Further, the RS port/resource ID may be implicitly or explicitly indicated. In one example, the indication is assumed only for the scheduled PDSCH or until next indication. Further, a scheduling/beam switch offset may be included. Also, a beam indication for receiving fall back unicast PDSCH may be included. In addition, the related signaling may be UE-specific.

Multiple Beam Pair Link (BPL) Handling:

The establishment and maintenance of multiple BPLs has several purposes. One purpose is for achieving PDCCH robustness, whereby the gNB can transmit PDCCH on multiple beam pair links simultaneously or in TDM fashion (e.g., the second example above). Another use is to support non-coherent joint transmission (JT) or distributed multiple input, multiple output (D-MIMO), where different BPLs potentially carry different PDSCHs. In either case, a beam-related indication is needed to assist UE-side beamforming (i.e., UE Rx beam selection).

Since the primary tool for maintaining (updating) beam pair links is UE measurement of multiple beam formed CSI-RS resources and subsequent feedback of a resource selection, a beam pair link is by nature associated with a previously transmitted CSI-RS resource. It is important to note that the terminology beam pair link (BPL) is a useful construct for discussion; however, the term itself may not appear in industry standards specifications. If not, then the salient feature that could be captured is that a BPL is defined as a link that has been established between the gNB and the UE, where the UE has selected and reported to the eNB at least one preferred out of a number of CSI-RS resources, transmitted with different transmitter configurations (Tx beams) and where a preferred UE receiver configuration (Rx beam) has been determined by the UE based on the selected CSI-RS resource.

Based on this, it follows automatically that a beam-related indication is a reference to a previously transmitted CSI-RS resource on which the UE has performed a measurement. If the previously transmitted CSI-RS resource is indicated to the UE in association with a current DL transmission (e.g., PDSCH, PDCCH, or CSI-RS), then the UE may use that information to assist in UE-side beamforming. An equivalent statement is that the current PDSCH DMRS, PDCCH DMRS, or CSI-RS transmission is spatially QCL at the UE RX with the previously transmitted CSI-RS resource referred to in the beam-related indication.

This clearly shows that the reference to the previously transmitted CSI-RS resource is precisely a QCL indication, consistent with the above first example.

A problem is then how to refer to a previously transmitted CSI-RS resource. One approach could be that each CSI-RS resource has an identifier (e.g., a timestamp in terms of radio frame number, slot number, and OFDM symbol number that can be used to uniquely identify the CSI-RS resource). However, such unique resource identification can consume a large amount of overhead. This is undesirable considering that the beam-related indication can be dynamically signaled (e.g., through DCI or MAC-CE). Another approach could be that a CSI-RS resource is always associated with a unique Tx beam in the network, and the beam-related indication to the UE uses that beam number. However, the number of beams could be a very large number, again leading to an overhead problem.

Rather than relying on absolute timestamps or fixed beam numbers, an alternative approach is to use a relative CSI-RS resource indicator or proxy to refer to a previously transmitted CSI-RS. Since the number of maintained BPLs could be quite small, the proxy indicator could have quite low overhead (e.g., two bits) allowing for the maintenance of up to four BPLs. One can think of the proxy as a "BPL tag." Associated with each BPL tag, is (1) the Tx configuration (Tx beam) corresponding to the UE-selected CSI-RS resource, and (2) the preferred UE receiver configuration (Rx beam) associated with the selected CSI-RS resource. It is important to realize that all that is necessary is for the gNB to remember the Tx configuration (Tx beam) associated with the BPL tag and for the UE to remember the Rx configuration (Rx beam) associated with the BPL tag. The gNB does not have to know the UE Rx beam, nor does the UE need to know the gNB Tx beam. No absolute beam indices are required. That way, in the future, if a BPL tag is signaled to the UE along with a DL signal transmission (e.g., PDSCH or CSI-RS), the UE can retrieve the Rx configuration that it used to receive the previously transmitted CSI-RS resource from its memory. This indication assists with UE-side beamforming to effectively receive the DL signal transmission.

To support downlink beam management, three procedures, the P1, P2 and P3 procedures, may be applied. In the P2 procedure, the transmitter sends the same reference signal multiple times (e.g., in different OFDM symbols) and each time in a different beam direction (e.g., different multi-antenna precoding weights). This is called a transmitter beam-sweep. The UE keep the RX beam unchanged during this beam-sweep and the UE can then report which one of these multiple beams it prefers. In the P3 procedure, the transmitter sends the same reference signal multiple times (e.g., in different OFDM symbols) and each time in the same beam direction. The receiver may then change its receiver beam direction (e.g., different multi-antenna receiver weights) in each occasion and hence, evaluate which is the preferred receive beam for that particular transmit beam. Lastly, the P1 procedure is a combination of the P2 and P3 procedures, where both the transmitter and receiver are allowed to alter their beams during the beam sweep. I One important use case for BPL tags is during the update (refinement) of a particular BPL, say the one with tag #b. As already discussed, this BPL with tag #b is associated with a CSI-RS resource on which the UE previously measured. The BPL can be updated, for example, with the P2 procedure. In this case, the gNB can trigger the UE to measure and report on an aperiodic CSI-RS beam sweep. The DCI message carrying the measurement and reporting trigger, should also include the BPL tag #b. With this indication, the UE look-up from memory what Rx configuration (Rx beam) is currently associated with tag #b, and it is free to use this information to assist in receiving the transmitted CSI-RS resources. The signaling of tag #b is equivalent to a QCL indication that says that the currently transmitted CSI-RS resources are spatially QCL at the UE RX with the previously transmitted CSI-RS resource associated with tag #b. As previously mentioned, to support up to four BPLs (e.g., b∈{0,1,2,3}), only two bits are needed in the DCI message, which uniquely indicates the previously transmitted CSI-RS resource.

The associated aperiodic CSI report will indicate a preferred CSI-RS resource through a Contention Resolution Identifier (CRI). The CSI-RS resource corresponding to this CRI is now the new, updated CSI-RS associated with tag #b. The gNB stores the Tx configuration (Tx beam) associated with tag #b in memory for future use. This could be used, for example, to ensure that a future aperiodic CSI-RS beam sweep includes the "old" Tx beam to be used as a reference against which the UE will compare potential new Tx beams.

Alternatively, the BPL with tag #b can be updated with a P3 procedure. In this case, the gNB can trigger the UE to measure and report on a number of CSI-RS resources for which the Tx configuration (Tx beam) is held fixed. The fixed Tx beam is the one already associated with tag #b. Again, the DCI message carrying the measurement trigger should include the BPL tag #b. However, the UE also needs to be informed that it should assume that the currently transmitted CSI-RS resources are not spatially QCL at the UE RX with the previously transmitted CSI-RS resource associated with tag #b. This could be done through a separate (one bit) flag to inform the UE whether or not this is a beam sweep using the P3 procedure. This flag may be signaled to the UE dynamically or configured through higher layers (e.g., within the CSI framework). Either way, when this flag is set to FALSE, the UE should not use the Rx configuration (Rx beam) that it used to receive the previous CSI-RS resource, since the purpose of the P3 beam sweep is for the UE to try new Rx beams, not hold its Rx beam fixed. Once the preferred Rx beam is found, the UE should remember the associated Rx configuration and associate this with tag #b. Since the Tx configuration (Tx beam) remains fixed, there is no need to associate a new CSI-RS with tag #b, nor is there a need for the UE to report CRI. However, the gNB can still configure the UE to report other CSI components (e.g., Channel Quality Indicator (CQI), Precoding Matrix Indicator (PMI), Rank Index (RI)) to support link adaptation.

The following two embodiments support beam management procedures to establish and maintain multiple BPLs between the gNB and a UE. By triggering multiple beam sweeps with different BPL tags, the reported measurements for each BPL allows the gNB to associate a UE-preferred gNB Tx beam for each BPL tag and allows the UE to associate a preferred UE Rx beam for each BPL tag. Hence, up to four BPLs can be established by the use of a two bit BPL tag.

In one embodiment, in an aperiodic CSI-RS beam sweep, to be able to reference a previously transmitted CSI-RS resource for spatial QCL purposes, the measurement and reporting trigger (e.g., in DCI) contains a BPL tag using two bits.

In another embodiment, in an aperiodic transmission of multiple CSI-RS resources in which the gNB keeps its Tx beam constant (e.g., P3 procedure), the UE should receive a one bit flag set to FALSE to indicate that the CSI-RS resources are not spatially QCL with a previously transmitted CSI-RS resource. This flag may be signaled dynamically, or if it is configured by higher layers, then this flag may be signaled as part of the CSI framework.

In parallel to the procedures for establishing and maintaining multiple BPLs, the UE can be configured with at least one BPL for PDCCH monitoring. The BPL the UE shall use for receiving PDCCH is configured by indicating the associated two bit BPL tag (e.g., through higher layer signaling). Alternatively, it could be specified that in the case of PDCCH monitoring of only a single BPL, that BPL tag 0 is always used. According to the second example above, M BPLs can be configured for PDCCH monitoring, either simultaneously or in a TDM fashion. In this case, the UE should be configured with M two bit BPL tags.

In one embodiment, a UE can be configured to monitor NR-PDCCH on M beam pair links, where each beam pair link is indicated by a BPL tag using two bits.

Another use case for BPL tags is for data transmission (e.g., different PDSCHs from different TRPs; or non-coherent JT or D-MIMO, where different BPLs potentially carry different PDSCHs). A BPL tag included with the scheduling DCI assists the UE-side beamforming for receiving the corresponding PDSCH.

In one embodiment, in a PDSCH transmission, the associated DCI contains a BPL tag using two bits that indicates that the DMRS for PDSCH is spatially QCL with the previously transmitted CSI-RS resource associated with the BPL tag.

From the above, beam management consists of three rather independent processes:

(1) establishment and maintenance of multiple BPLs, each identified with a two bit BPL tag;

(2) the BPL(s) to use for control channel; and (3) the BPL(s) used for data channel.

While the BPLs are considered independent, when a BPL TX and RX beam is updated in the measurement process, it reflects the beams that can be used for the control channels and the data channels that use the BPL as well.

Group-Based Beam Reporting:

Another issue is related to set/group based reporting, which can be useful for UEs that are able to support simultaneous reception on two or more beam pair links (BPLs). This UE capability can be a result of a UE equipped with two or more antenna panels with separate receive chain(s). One working assumption is that NR should support at least one of two alternatives for such reporting: set-based reporting and/or group-based reporting.

Another issue is related to overhead. Reporting beam-related information on multiple sets/groups of beams of course incurs extra feedback overhead compared to single-beam reporting. For instance, set and group-based reporting can offer the gNB the same flexibility in selecting amongst Tx beams that may be received simultaneously at the UE; however, for equal flexibility, the feedback overhead for set-based reporting can be larger than group-based reporting.

Another overhead consideration is beam-related indication in the downlink (e.g., QCL indication to support UE-side beamforming when beams from different sets are groups are selected for transmission). Like for the uplink overhead, there may be differences in overhead between set and group-based reporting when the gNB would like to select multiple beams for transmission within a set or across groups.

QCL for DL RS:

With respect to QCL for DL RS, different system requirements associated with QCL may be applied. In a first example, DMRS ports grouping may be supported, with DMRS ports within one group being QCL'ed, and DMRS ports in different groups being non-QCL'ed. DMRS may be grouped according to continuous wave (CW) analog beams, or the like. Further, the QCL indication may be signaled using, for instance, radio resource control (RRC), MAC CE, DCI, or the like. Also, a DMRS may be used to estimate of large scale properties of a channel such as Doppler shift, Doppler spread, delay spread, or the like. In addition, QCL supports functionalities such as beam management (e.g., spatial parameters), frequency/timing offset estimation (e.g., Doppler/delay parameters), radio resource management (RRM) (e.g., average gain). Moreover, if the UE scheduled more than one PDSCH in a slot (this is the typical multi-TRP case using e.g., non-coherent JT), then the DMRS in the first and second PDSCH may not be QCL'ed.

In a second example, an indication of a QCL assumption associated with a subset of QCL parameters between antenna ports of two RS resources may be supported based on various alternatives. These alternatives may include at least one of (1) which of the subset of QCL parameters are configured by gNB, (2) which QCL type is configured by gNB where multiple QCL types are pre-defined, and (3) which QCL types are pre-defined.

In a third example, the UE is not indicated by default. Accordingly, antenna port(s) transmitted on different CCs are not assumed to be QCL'ed.

In a fourth example, an indication of QCL assumption for CSI-RS may be associated with an SS block such as (e.g., SSS, PBCH DMRS (if defined)), RS for fine time-frequency tracking (if it's not CSI-RS), or the like.

In one embodiment, DMRS belonging to different PDSCH scheduling in the same slot are by default not QCL. Hence, the DMRS in one PDSCH is the first group and DMRS in the other PDSCH is the second group.

When it comes to non-QCL DMRS groups within a single PDSCH, the intended use case would be the multi-TRP transmission for the general QCL parameter case or the multi-beam transmission from a single TRP for the spatial QCL case. The latter then holds for UEs with analog beamforming (due to the use of spatial QCL), which has the capability to receive more than one beam at the same time. As a baseline, dual PDSCH scheduling may be used for this case.

gNB implementation of very wide bandwidths compared to LTE may use independent calibration circuits, clocks and oscillators per CC. Hence, beam management procedures and thus spatial QCL per carrier may be operated independently.

In one embodiment, beam management and thus sQCL assumptions operate independently per component carrier.

QCL Between SS block, RAR and PDCCH DMRS:

This section focuses on spatial QCL, to aid the beam management for millimeter (mm)-wave operation, while there is a more general QCL discussion needed for other QCL parameters such as average delay, average gain, Doppler, or the like, and whether to link CSI-RS to the RS(s) used for fine channel tracking using QCL. The UE will detect an SS block which may have sector coverage (in case of a single SS block per TRP) or rather wide beam width (in case of a few SS blocks per TRP). Which SS block the UE has detected is known through the initial access procedure (i.e., related to the used PRACH preamble resource). The SS block beams are not expected to be very narrow in beam width at least not in the normal case, since it has problems with, for example, overhead (although a large number of SS blocks may be allowed in specs to support extreme coverage cases where overhead is not the largest concern).

A self-contained random access response (RAR) is used, and the RAR may be spatially QCL at the UE with the detected SS block if indicated in the PBCH. It is reasonable to transmit initial PDCCH by default in the same beam as the detected RAR; and thus, also the SS block, if indicated by PBCH. The default PDCCH allows the gNB to configure the UE with, for example, CSI-RS for beam management.

In one embodiment, the UE may assume by default that the PDCCH DMRS is spatial QCL with the detected SS block if indicated in the broadcasted PBCH. This default spatial QCL may be overridden by UE specific and dedicated RRC signaling.

For PDSCH and possibly also PDCCH on the other hand, narrowest possible beams may be used and those beams may be selected and managed by beam management using dedicated CSI-RS measurements. Hence, in this case, the PDCCH and PDSCH may be configured to be spatially QCL with the CSI-RS resource indicated in the beam management procedure (beam indication). Depending on the channel to receive, the UE may utilize different spatial QCL assumptions, for example, PDCCH with the detected and preferred SS block (SS-QCL), PDCCH with a configured CSI-RS (CSI-RS-QCL), or the like.

QCL Between CSI-RS Resources:

QCL between antenna ports of two CSI-RS resources may be supported. Further, the dynamic indication of gNB and UE side partial QCL assumptions between the CSI-RS beam sweeps P1 and P2/P3 may be supported. Hence, when triggering an aperiodic CSI-RS beam sweep and associated aperiodic CSI report containing CRI, the triggering DCI may contain a reference to a previously transmitted CSI-RS resource so that the UE may utilize this information to tune its RX beam.

Moreover, a proxy such as the beam pair link (BPL) identity may be used when referring to a previous CSI-RS resource. Hence, when triggering a P2/P3, then a BPL index is included in the triggering DCI and that BPL is in turn linked to a certain CSI-RS resource that the UE has measured and reported on at a previous point in time.

In one embodiment, the dynamic indication in DCI of spatial QCL assumptions between CSI-RS resources when triggering a CSI-RS measurement for beam management is supported.

QCL for UL RS:

With respect to QCL for UL RS, different system requirements may be applied. NR may support with and without a downlink indication to derive QCL assumption for assisting UE-side beamforming for downlink control channel reception. This indication may be signaled using, for instance, DCI, MAC CE, RRC, or the like. Further, a beam-related indication may be used for DL control and data channels. Further, for downlink, NR may support beam management with and without beam-related indications. When a beam-related indication is provided, information pertaining to UE-side beamforming/receiving procedure used for data reception may be indicated through QCL to UE. Tx/Rx beam correspondence at TRP and UE may be defined. In one example, Tx/Rx beam correspondence at TRP holds if at least one of the following is satisfied: TRP is able to determine a TRP Rx beam for the uplink reception based on UE's downlink measurement on TRP's one or more Tx beams, and TRP is able to determine a TRP Tx beam for the downlink transmission based on TRP's uplink measurement on TRP's one or more Rx beams. In another example, Tx/Rx beam correspondence at UE holds if at least one of the following is satisfied: UE is able to determine a UE Tx beam for the uplink transmission based on UE's downlink measurement on UE's one or more Rx beams, and UE is able to determine a UE Rx beam for the downlink reception based on TRP's indication based on uplink measurement on UE's one or more Tx beams.

For non-codebook based UL transmission, frequency selective precoding for Cyclic Prefix (CP)-OFDM is supported when the number of transmission ports is greater than a predetermined number such as two ports, three ports, four ports, or the like. Further, the indication of DL measurement RS is supported to allow the UE to calculate candidate precoder. Also, the mechanisms for UL precoder determination may be based on precoded SRS, non-precoded SRS, hybrid precoded, non-precoded SRS, or the like.

For nodes that have reciprocity-calibrated transmitter and receiver chains, it may be known when a signal that will be received is the reciprocal response to another signal that was transmitted earlier or vice versa. That is, assuming a node with analog beamforming is transmitting an SRS or a PRACH with some analog beam, when receiving a response to the sounding or PRACH, the UE may expect the response to arrive through the reciprocal channel, for which the receiver beam could favorably be the same beam as was used for the reciprocal transmission. Likewise, the PRACH transmission may be a response to a received SS block or a mobility RS. Hence, the spatial QCL framework could be extended to also cover the use case of reciprocal responses for analog beamforming by defining the received signal to be reciprocally quasi co-located with the transmitted signal or vice versa.

In one embodiment, reciprocal spatial quasi co-location is supported at a node, where a signal received at a node and a transmitted signal from the same node, are spatially QCL.

In particular, when beam correspondence holds at the UE, which likely may be a default operation, then the UE may be signaled to transmit precoded SRS or a precoded PUSCH or PUCCH in the same direction as it has received a certain CSI-RS.

In one embodiment, reciprocal spatial QCL is supported at the UE between the reception of an SS block or a CSI-RS resource and a transmitted signal such as an SRS resource, PUCCH, or PUSCH.

This will ensure that a gNB knows the receive spatial correlation of a signal transmitted from the UE; thus, the gNB can adapt its receiver accordingly. For non-codebook based UL transmission of data (i.e., where precoding is decided by the UE), the indication of DL measurement RS may be supported so that the UE may calculate the candidate precoder.

In one embodiment, in UL transmission scheme B, a DL indication defines which CSI-RS is reciprocally and spatially QCL with the scheduled PUSCH and PUCCH DMRS. This signaling may be at least included in the DCI carrying the UL grant. UL transmission scheme B is channel reciprocity-based uplink. Further, the UE may determine the precoder on its own. UL transmission scheme B may also be referred to as a non-codebook uplink transmission scheme.

Moreover, when there is a problem with uplink interference where many UE transmit up-link data and sounding at the same time and the network is dense (e.g., many gNBs in a small area), it is beneficial to reduce uplink interference by using uplink precoding based on channel reciprocity.

In one embodiment, suppression of uplink interference is supported towards victim gNB using precoded transmitted signals from the UE, by defining that the transmission is not spatially QCL (in reciprocal sense) with the reception of a CSI-RS resource transmitted from a victim TRP or gNB. The transmitted signal may be, for example, PUSCH, PUCCH, SRS, or the like. Again, additional explicit signaling may be needed to indicate which CSI-RS resource are victim and which are desired.

| ABBREVIATIONS: | |
|---|---|
| Abbreviation | Explanation |
| 3GPP | 3rd Generation Partnership Project |
| 5G | 5th Generation mobile networks or wireless systems |
| BS | Base Station |
| CE | Control Element |
| CP | Cyclic Prefix |
| CRC | Cyclic Redundancy Check |
| CRS | Cell Specific Reference Signal |
| CSI | Channel State Information |
| CSI-RS | Channel state information reference signal |
| CSS | Common Search Space |
| DL | Downlink |
| DMRS | Demodulation reference signal |
| eNB | Evolved Node B (i.e., base station) |
| E-UTRA | Evolved Universal Terrestrial Radio Access |
| E-UTRAN | Evolved Universal Terrestrial Radio Access Network |
| DFT | Discrete Fourier Transform |
| FDD | Frequency Division Duplex |
| IFFT | Inverse Fast Fourier Transform |
| IoT | Internet of Things |
| LTE | Long Term Evolution |
| MAC | Medium Access Control |
| MIMO | Multiple Input Multiple Output |
| MSR | Multi-Standard Radio |
| MTC | Machine-Type Communication |
| NB | Narrow-Band |
| NB-IoT | Narrow-Band Internet of Things |
| NB-LTE | Narrow-Band LTE (e.g., 180 KHz bandwidth) |
| NB-PBCH | NB-IoT Physical Broadcast Channel |
| NB-PSS | NB-IoT Primary Synchronization Sequence |
| NB-SSS | NB-IoT Secondary Synchronization Sequence |
| OFDM | Orthogonal Frequency Division Modulation |
| OFDMA | Orthogonal Frequency Division Modulation Access |
| PA | Power Amplifier |
| PAPR | Peak-to-Average Power Ratio |
| PBCH | Physical Broadcast Channel |
| PDCCH | Physical Data Control Channel |
| PDCP | Packet Data Convergence Protocol (PDCP) |
| PDU | Protocol Data Unit |
| PRACH | Physical Random Access Channel |
| PRB | Physical Resource Block |
| PSD | Power Spectral Density |
| PSS | Primary Synchronization Sequence |
| PUSCH | Physical Uplink Shared Channel |
| RACH | Random Access Channel |
| RAT | Radio Access Technology |
| RBR | Recommended Bit Rate |
| RF | Radio Frequency |
| RRC | Radio Resource Control |
| RS | Reference signal |
| RX | Receiver |
| SoC | System-on-a-Chip |
| SC-FDMA | Single-Carrier, Frequency Division Multiple Access |
| SFBC | Space Frequency Block Coding |
| SIB | System Information Block |
| SIM | Subscriber Identity Module or Subscriber Identification Module |
| SNR | Signal to Noise Ratio |
| SRS | Sounding Reference Signal |
| SS | Synchronization Signal |
| SSS | Secondary Synchronization Sequence |
| TDD | Time Division Duplex |
| TSS | Tertiary synchronization signal or Time synchronization signal |
| TX | Transmitter |
| UE | User Equipment |
| UL | Uplink |
| USS | UE-specific Search Space |

| ABBREVIATIONS: | |
|---|---|
| Abbreviation | Explanation |
| WB-LTE | Wideband LTE (i.e., corresponds to legacy LTE) |
| ZC | Zadoff-Chu algorithm |

The various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise, Relational terms such as "first" and "second," and the tike may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being dose to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

The invention claimed is:

1. A method performed by a wireless device in a wireless communications system, comprising:
    transmitting, by the wireless device, a first signal of a first type using a first transmitter configuration based on a first quasi co-location (QCL) assumption associating the first signal with a first reference signal received by the wireless device; and
    transmitting, by the wireless device, a second signal of a second type using a second transmitter configuration based on a second QCL assumption associating the second signal with a second reference signal received by the wireless device, the second type being different from the first type, and
    wherein the second signal of the second type is a physical uplink control channel (PUCCH) signal.

2. The method of claim 1, wherein the first reference signal is a broadcasted reference signal and the second reference signal is a user equipment (UE)-specific configured reference signal.

3. The method of claim 2, wherein the broadcasted reference signal is a reference signal in a synchronization signal (SS) block and the UE-specific reference signal is a channel state information reference signal (CSI-RS).

4. The method of claim 1, wherein the first signal of the first type is a common signal and the second signal of the second type is a user equipment (UE)-specific signal.

5. The method of claim 1, wherein the first and second signals are user equipment (UE) specific signals.

6. The method of claim 1, wherein the first reference signal is a reference signal in a preferred synchronization signal (SS) block and the first signal of the first type is a common search space or a group common search space of a physical downlink control channel (PDCCH).

7. The method of claim 1, wherein the first reference signal is a reference signal in a preferred synchronization signal (SS) block and the first signal of the first type is a user equipment (UE) specific search space of a physical downlink control channel (PDCCH).

8. The method of claim 1, wherein the second reference signal is a channel state information reference signal (CSI-RS).

9. The method of claim 1, wherein the second reference signal is a reference signal (RS) in a preferred synchronization signal (SS) block.

10. The method of claim 1, wherein the first transmitter configuration corresponds to a beam direction used to receive the first reference signal.

11. The method of claim 1, wherein the second transmitter configuration corresponds to a beam direction used to receive the second reference signal.

12. A wireless device, comprising:
at least one processor and a memory, the memory comprising instructions executable by the at least one processor whereby the wireless device is configured to:
transmit a first signal of a first type using a first transmitter configuration based on a first quasi co-location (QCL) assumption associating the first signal with a first reference signal received by the wireless device; and
transmit a second signal of a second type using a second transmitter configuration based on a second QCL assumption associating the second signal with a second reference signal received by the wireless device, the second type being different from the first type, and
wherein the second signal of the second type is a physical uplink control channel (PUCCH) signal.

13. A method performed by a wireless device in a wireless communications system, comprising:
obtaining a particular one of a plurality of quasi co-location (QCL) assumptions, the particular one of the plurality of QCL assumptions associating a certain reference signal reception by a wireless device with a transmission of a signal of a certain type of a plurality of types by that wireless device; and
transmitting the signal of the certain type using a transmitter configuration based on the particular one of the plurality of QCL assumptions that associates the signal of the certain type with the certain reference signal received by the wireless device, and
wherein the signal of the certain type is a physical uplink control channel (PUCCH) signal.

14. The method of claim 13, wherein said obtaining includes:
receiving, from a network node, an indication of the particular one of the plurality of QCL assumptions.

15. The method of claim 14, wherein the indication includes a subset of QCL parameters.

16. A wireless device, comprising:
at least one processor and a memory, the memory comprising instructions executable by the at least one processor whereby the wireless device is configured to:
obtain a particular one of a plurality of quasi co-location (QCL) assumptions, the particular one of the plurality of QCL assumptions associating a certain reference signal reception by a wireless device with a transmission of a signal of a certain type of a plurality of types by that wireless device; and
transmit the signal of the certain type using a transmitter configuration based on the particular one of the plurality of QCL assumptions that associates the signal of the certain type with the certain reference signal received by the wireless device, and
wherein the signal of the certain type is a physical uplink control channel (PUCCH) signal.

17. A method performed by a network node in a wireless communications system, comprising:
obtaining a particular one of a plurality of quasi co-location (QCL) assumptions for a wireless device, the particular one of the plurality of QCL assumptions associating a certain reference signal reception by the wireless device with a transmission of a signal of a certain type of a plurality of types by that wireless device; and
transmitting, to the wireless device, an indication of the particular one of the plurality of QCL assumptions; and
receiving, from the wireless device, the signal of the certain type that is associated, according to the particular one of the plurality of QCL assumptions, with the certain reference signal transmitted by the network node to the wireless device, and
wherein the signal of the certain type is a physical uplink control channel (PUCCH) signal.

18. The method of claim 17, wherein said obtaining includes:
determining the particular one of the plurality of QCL assumptions for the wireless device.

19. The method of claim 17, wherein the plurality of QCL assumptions includes at least one of a spatial relation between a reference signal reception by a wireless device and a transmission of a signal of a certain type by that wireless device and a QCL reference between a reference signal reception by a wireless device and a reception of a signal of a certain type by that wireless device.

20. A network node, comprising:
at least one processor and a memory, the memory comprising instructions executable by the at least one processor whereby the network node is configured to:
obtain a particular one of a plurality of quasi co-location (QCL) assumptions for a wireless device, the particular one of the plurality of QCL assumptions associating a certain reference signal reception by the wireless device with a transmission of a signal of a certain type of a plurality of types by that wireless device; and
transmit, to the wireless device, an indication of the particular one of the plurality of QCL assumptions; and
receive, from the wireless device, the signal of the certain type that is associated, according to the particular one of the plurality of QCL assumptions, with the certain reference signal transmitted by the network node to the wireless device, and
wherein the signal of the certain type is a physical uplink control channel (PUCCH) signal.

* * * * *

UNITED STATES PATENT AND TRADEMARK OFFICE
CERTIFICATE OF CORRECTION

Page 1 of 1

PATENT NO. : 12,052,075 B2
APPLICATION NO. : 16/794450
DATED : July 30, 2024
INVENTOR(S) : Frenne et al.

It is certified that error appears in the above-identified patent and that said Letters Patent is hereby corrected as shown below:

In the Specification

In Column 1, Line 9, delete "15/749,470" and insert -- 15/769,470 --, therefor.

In Column 1, Line 10, delete "2018" and insert -- 2018, now U.S. Pat. No. 10,615,859, --, therefor.

In Column 2, Line 8, delete "multiplex" and insert -- multiplexing --, therefor.

In Column 2, Line 37, delete "PDCCH," and insert -- PDSCH, --, therefor.

In Column 20, Line 20, delete "indicator or proxy to" and insert -- indicator—or proxy—to --, therefor.

In Column 26, Line 37, delete "Modulation" and insert -- Multiplexing --, therefor.

In Column 26, Line 38, delete "Modulation" and insert -- Multiple --, therefor.

In Column 26, Line 41, delete "Data" and insert -- Downlink --, therefor.

In Column 26, Line 42, delete "Protocol (PDCP)" and insert -- Protocol --, therefor.

In Column 28, Line 10, delete "dose" and insert -- close --, therefor.

In the Claims

In Column 30, Line 13, in Claim 17, delete "device; and" and insert -- device; --, therefor.

In Column 30, Line 42, in Claim 20, delete "device; and" and insert -- device; --, therefor.

Signed and Sealed this
Sixth Day of May, 2025

Coke Morgan Stewart
*Acting Director of the United States Patent and Trademark Office*